United States Patent
Govindassamy

(10) Patent No.: US 10,530,604 B1
(45) Date of Patent: Jan. 7, 2020

(54) METHOD AND APPARATUS FOR SHARING BROADBAND COMMUNICATION SERVICES

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 275 days.

(21) Appl. No.: 15/596,438

(22) Filed: May 16, 2017

(51) Int. Cl.
| | |
|---|---|
| H04L 12/28 | (2006.01) |
| H04W 60/00 | (2009.01) |
| H04W 84/12 | (2009.01) |
| H04W 92/02 | (2009.01) |

(52) U.S. Cl.
CPC ......... *H04L 12/2869* (2013.01); *H04W 60/00* (2013.01); *H04W 84/12* (2013.01); *H04W 92/02* (2013.01)

(58) Field of Classification Search
CPC .. H04L 12/2869; H04W 60/00; H04W 92/02; H04W 84/12
See application file for complete search history.

(56) References Cited

U.S. PATENT DOCUMENTS

| | | | | |
|---|---|---|---|---|
| 6,073,014 A * | 6/2000 | Blanchard | ................ | H04B 7/10 455/426.1 |
| 9,635,711 B1 | 4/2017 | Govindassamy | | |
| 2004/0014474 A1 * | 1/2004 | Kanada | ................. | H04W 48/18 455/444 |
| 2005/0201382 A1 | 9/2005 | Xue et al. | | |
| 2006/0079236 A1 | 4/2006 | Del Pino et al. | | |
| 2010/0046468 A1 * | 2/2010 | Oi | .......................... | H04W 84/20 370/331 |
| 2011/0280118 A1 * | 11/2011 | Maharana | ........... | H04L 41/0659 370/216 |
| 2012/0238236 A1 * | 9/2012 | Liao | ....................... | H04W 76/50 455/404.2 |
| 2014/0045496 A1 | 2/2014 | Fox | | |
| 2014/0273965 A1 | 9/2014 | Raleigh et al. | | |
| 2017/0238184 A1 * | 8/2017 | Yang | ..................... | H04W 12/06 726/3 |
| 2017/0289796 A1 | 10/2017 | Raleigh et al. | | |
| 2017/0339617 A1 * | 11/2017 | Lei | ....................... | H04B 17/318 |
| 2018/0199193 A1 | 7/2018 | Lee et al. | | |

* cited by examiner

*Primary Examiner* — Ivan O Latorre
(74) *Attorney, Agent, or Firm* — Lerner, David, Littenberg, Krumholz & Mentlik, LLP

(57) ABSTRACT

Mobile communication services that include voice calls, text messages, and internet are transitioning from circuit switched to packet switched networks such as internet. Although internet usage by mobile devices is on the rise, voice calls and text messages continue to be routinely and widely used. Most users at home or office may typically have phones that may be primarily based on wired connections. Although the eventual connection to the network may be wired, cordless phones may be used within the premises to connect with the base of the cordless phone which may connect to the wired network. A method and apparatus are disclosed that enable multi-user service with single broadband internet service in a base device and distribute the voice and text message service to the other users in the local premises. This may enable reduced cost and power consumption along with improved performance and user experience.

16 Claims, 23 Drawing Sheets

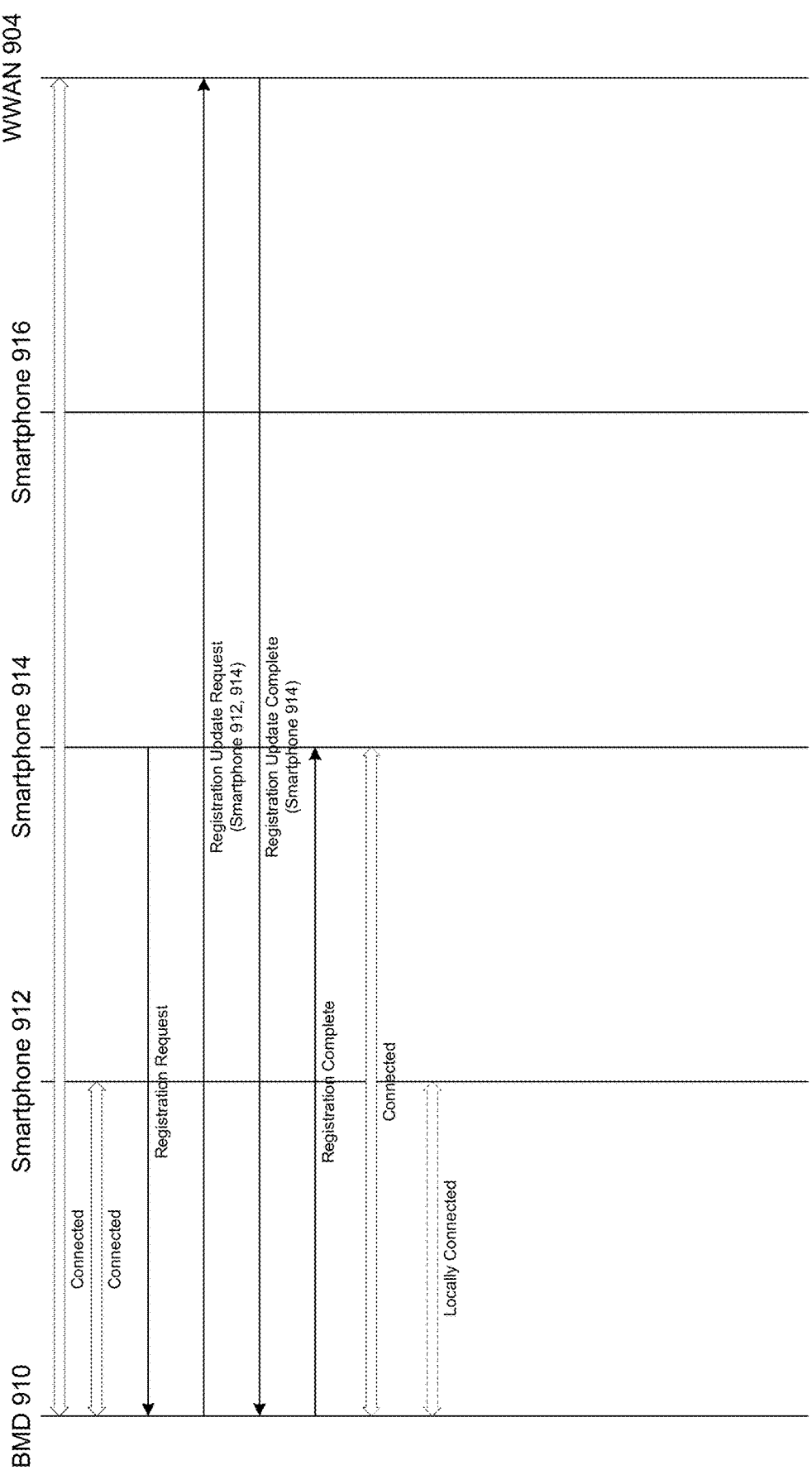

METHOD AND APPARATUS FOR SHARING BROADBAND COMMUNICATION SERVICES

CROSS-REFERENCE TO RELATED APPLICATIONS

This application is related to U.S. application Ser. Nos. 15/964,405 and 15/596,502 filed May 16, 2017, the disclosures of which are hereby incorporated herein by reference.

BACKGROUND

Internet access is becoming ubiquitous and the means by which the access is obtained varies widely. For example, the internet access may be through a Digital Subscriber Line (DSL), a cable modem, a fiber optic network, a wireless communication network, etc. When the internet service provides high data transfer rates it is often referred to as broadband internet service. Broadband internet service is generally understood to be a service that is always on and offers data transfer rates on the order of mega-bits per second for both download and upload.

A client device as defined in the present disclosure is a device that may use the internet from one or more of the sources from which internet service is available. Such client devices may include conventional client devices such as a smartphone, a tablet, a feature-phone, a laptop or desktop personal computer, etc. Other client devices may include devices that are embedded within devices that perform other functions. For example, an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, industrial equipment, etc., may include a client device. These types of devices may be collectively referred herein as machine type client devices.

These diverse types of client devices may access the internet service directly through one of the sources of primary internet access as mentioned earlier. Alternatively, a client device may access the internet through a local network, which may perform distribution of the primary internet access to the users localized in a given area. Examples of such local networks include Local Area Network (LAN) using Ethernet, Wireless LAN (WLAN) commonly known as Wi-Fi, or some other local area networking schemes. When a client device is in the proximity of a location where such a LAN or WLAN access is available, it may access the internet using the LAN or WLAN. FIG. 1 illustrates an example scenario of client devices accessing the internet over a WLAN network that is connected to a traditional wire-line internet service such as a DSL or a cable modem. The local area where WLAN service is available is often referred to as a Hotspot. The device that offers the WLAN service in a given local area is referred to as an Access Point (AP). In the present disclosure, the terms Hotspot AP or Hotspot are used interchangeably to refer to the device that offers the WLAN service in a given local area.

A Hotspot AP may be connected to the DSL/cable modem through any of the standardized interfaces such as Universal Serial Bus (USB), Ethernet, or proprietary interfaces. In some cases, the DSL/cable modem and the Hotspot AP may be part of a single physical device. In such cases, the interface between the DSL/cable modem and AP may use Secure Digital Input Output (SDIO) or another suitable interface.

Client devices may also obtain internet access over mobile wireless networks. These mobile wireless networks are often referred to as Wireless Wide Area Network (WWAN). The internet service offered by such networks is often referred to as mobile broadband internet or Mobile Broadband (MB) and the mobile wireless networks are often referred to as mobile broadband networks. The terms WWAN and MB are used interchangeably herein.

As the variety of client devices has increased and the demand for MB access has increased, a device known as a mobile Hotspot is commonly used. A mobile Hotspot device includes both a modem for MB access and a WLAN AP (Hotspot AP) to distribute the internet to local client devices. FIG. 2 illustrates the block diagram of an example mobile Hotspot device. As shown in FIG. 2, for the chosen example, the MB modem and the Hotspot AP may be connected to each other via one of the standard interfaces used in the industry such as USB, SDIO, or proprietary interfaces. In another mobile Hotspot example, the MB modem and the WLAN AP may be an Integrated Circuit (IC) as shown in FIG. 3.

Some mobile Hotspot devices may serve as a single function device, i.e., they only perform the mobile Hotspot function. Such mobile Hotspots may take many different form factors such as a mobile Hotspot integrated into an automobile, a standalone device that may be carried around with or without a battery, integrated into an accessory device such as a tablet, a standalone device that may be powered by a power wall outlet, etc.

Some client devices have multiple capabilities and being a Hotspot is one of the capabilities. For example, a smartphone may have a mobile broadband modem that may be used to get mobile internet service directly from the mobile broadband network as illustrated in FIG. 4. The flow of data is as shown in FIG. 4 from the mobile broadband modem to the application processor that processes the download and upload data and interacts with the user via the display and other elements of the user interface such as audio, vibration, etc. The smartphone may also have a WLAN modem to access internet service over a Hotspot AP. When it is near a Hotspot AP, it may use internet service from the Hotspot as illustrated in FIG. 1. In another smartphone example, the mobile broadband modem, the WLAN AP and the Application Processor may be an integrated device as shown in FIG. 5.

A smartphone may also serve as a mobile Hotspot to provide internet service over WLAN to other client devices in its vicinity. FIG. 6 illustrates an example scenario where the smartphone serves as a mobile Hotspot and provides internet service to a client device that may have only the WLAN access. In another smartphone mobile hotspot example, the mobile broadband modem, the WLAN AP and the Application Processor may be integrated into a single IC as shown in FIG. 7.

A client device may go in and out of the coverage of and service from a Hotspot or mobile Hotspot and seamlessly maintain the continuity of internet service by switching over to the WWAN when not connected to or not getting service from a Hotspot.

Some services such as voice calls and Short Message Service (SMS) based text messaging are transitioning from circuit switched network to packet switched network. Although internet usage by client devices is on the rise, voice calls and SMS based text messages continue to be routinely and widely used. Most users at home or office may typically have phones that may be primarily based on wired connections. Although the eventual connection to the telephone network may be wired, cordless phones may be used within the premises to connect with the base of the cordless phone which may connect to the wired telephone network. Sometimes the telephone service may be based on Wireless Local Loop (WLL) technology. Regardless of whether the phone service is through landline or WLL, cordless phones are widely and commonly used at homes and offices.

Although a Hotspot or mobile Hotspot is able to obtain internet service and distribute it to multiple client devices in a given local area, it may not be able to provide other key services that users commonly use. For example, voice calls and SMS based text messaging remain two of the most commonly used applications in client devices. A client device accessing internet through a Hotspot or mobile Hotspot may still be receiving voice calls or SMS based text messages directly through the WWAN as illustrated in FIG. 8. Four interconnected networks are shown in FIG. 8: Public Switch Telephone Network (PSTN) 802, WWAN 804, internet 806, and WLAN (Hotspot) 808. The PSTN is connected to the WWAN through the interface 820 and to the internet through the interface 822. The WWAN and internet are connected through the interface 818. The Cable modem 812 is connected to the internet through the interface 824. These interfaces may use open industry standards or may use proprietary standards. The Hotspot, in the present example, is connected to the internet using a Cable modem interface. In the present example, the Smartphone 812 is connected to the Hotspot Access Point 810 for internet service through the Cable modem 812. Simultaneously, it is also connected to the WWAN 804 for voice calls and SMS based text messaging. The Smartphone 812 may exchange SMS based text messages with the Smartphone 814 over the WWAN 804. The Smartphone 812 may have voice calls with the landline phone 816 through WWAN 804 and PSTN 802. The cordless phone 826 may access the conventional landline voice service through the cordless base 828 which in turn is connected to the PSTN 802 though the conventional landline interface 830. The coverage area 808 of the WLAN Hotspot and the coverage area 832 of the cordless base 832 may partially or fully overlap.

The Voice over Internet Protocol (VoIP) is a protocol commonly used to provide voice, video, and other streaming services over internet. In addition to VoIP, a comprehensive set of protocols and frameworks such as Session Initiation Protocol (SIP) and Internet Protocol Multimedia System (IMS) are used to provide Rich Communication Services (RCS) over internet. Although many so called "over-the-top" applications and services such as Skype are available to use for voice calls and text messaging over the internet service provided by a Hotspot or a mobile Hotspot, they are limited by the number of users who have the same applications and are online at any given time. Therefore, a more comprehensive solution using SIP and its related technologies are more broadly adopted by WWAN operators. In the present disclosure, over-the-top services are not considered in further description. Whenever voice calls or SMS based text messaging is mentioned, it is intended to refer to the services offered by a WWAN either over its dedicated circuit switched network or over its packet switched network using VoIP, SIP, IMS, and/or similar protocols.

SUMMARY

A method and apparatus are disclosed that enable all the services for a client device including voice and video calls, SMS based text messaging, and internet to be provided by a single local device and the client device may be seamlessly able to go in and out of service from a local device such as a Hotspot and maintain continuity of all the services by switching over to WWAN as and when needed. Getting all services from a local device may offer cost and power consumption advantages as well as improved performance and user experience. Furthermore, a single device and subscription may be used to serve multiple client devices for all different services offered by the WWAN.

In accordance with an aspect of the present disclosure, a method may provide for sharing broadband communication services with a first client device of a plurality of client devices as Group Member Devices (GMDs) which are connectable with a base mobile device (BMD) to obtain internet service, wherein when a first GMD of the GMDs is in a coverage area of the BMD the first GMD can connect with and obtain internet service from the BMD through Short Range Wireless Links (SRWL) via a first modem of the BMD, and wherein when the first GMD is connected with the BMD via a wired connection the first GMD can connect and obtain the internet service from the BMD via the wired connection, wherein the method may include: controlling, by a processing device at the first GMD, registering the first GMD with the BMD to obtain the interest service from the WWAN through the BMD; and when the first GMD is registered with the BMD, deregistering with the BMD before the first GMD is registered directly with the WWAN with a same identity.

In one alternative, the first GMD may have multiple unique identities and can connect to the WWAN directly with the same unique identity.

In one alternative, the method may include controlling, by the processing device, originating at the first GMD a service including at least one of a voice call, video call or a SMS based text messaging with the WWAN through the BMD.

In one alternative, the method may include controlling, by the processing device, when the first GMD is near an edge of the coverage area of the BMD or a first GMD is controlled based on input from a user not to be connected with the BMD, initiating a WWAN related registration procedure including at least one of Location Area Update (LAU), Tracking Area Update (TAU) or Routing Area Update (RAU) with the WWAN, to cause automatic deregistration of the first GMD from the BMD and the WWAN to inform the BMD about the first GMD previously registered with the BMD now being registered directly with the WWAN.

In one alternative, the method may include controlling, by the processing device, transmitting a message to the BMD indicating intent to deregister the first GMD prior to disconnecting of the first GMD from the BMD.

In one alternative, the method may include controlling, by the processing device, when the first GMD moves out of the coverage area of the BMD for a period of time $T_{cg}$, initiating a direct registration with the WWAN to obtain service at the first GMD from the WWAN.

In one alternative, the method may include controlling, by the processing device, when the first GMD moves out of the coverage of the BMD for a period of time $T_{cg}$, and the first GMD returns into the coverage area of BMD after the time period $T_{cg}$, initiating a BMD registration procedure to register with the BMD and then with the WWAN to obtain service from the WWAN; and when the first GMD enters the coverage area of the BMD after the time period $T_{cg}$ and the first GMD is directly registered with the WWAN, deregistering the first GMD with the WWAN before attempting to register the first GMD with the BMD.

In one alternative, the method may include controlling, by the processing device, when a new GMD is registered with the BMD and registration information of the first GMD is updated with the WWAN when the new GMD is registered with the WWAN by the BMD, extending a timer for periodic registration update in the first GMD.

In one alternative, the method may include controlling, by the processing device, when the first GMD is registered with the BMD, sharing capability of the first GMD with the BMD, in which the capability includes ability to operate as a given BMD, service capability, Quality of Service (QoS) supported or SRWLs supported.

In accordance with an aspect of the present disclosure, an apparatus may provide for sharing broadband communication services with a first client device of a plurality of client devices as Group Member Devices (GMDs) which are connectable with a base mobile device (BMD) to obtain internet service, wherein when a first GMD of the GMDs is in a coverage area of the BMD the first GMD can connect with and obtain internet service from the BMD through Short Range Wireless Links (SRWL) via a first modem of the BMD, and wherein when the first GMD is connected with the BMD via a wired connection the first GMD can connect and obtain the internet service from the BMD via the wired connection, wherein the apparatus may include circuitry configured to control at the first GMD, registering the first GMD with the BMD to obtain the interest service from the WWAN through the BMD; and when the first GMD is registered with the BMD, deregistering with the BMD before the first GMD is registered directly with the WWAN with a same identity.

In one alternative of the apparatus, the first GMD may have multiple unique identities and can connect to the WWAN directly with the same unique identity.

In one alternative of the apparatus, the circuitry may be configured to control originating at the first GMD a service including at least one of a voice call, video call or a SMS based text messaging with the WWAN through the BMD.

In one alternative of the apparatus, the circuitry may be configured to control, when the first GMD is near an edge of the coverage area of the BMD or a first GMD is controlled based on input from a user not to be connected with the BMD, initiating a WWAN related registration procedure including at least one of Location Area Update (LAU), Tracking Area Update (TAU) or Routing Area Update (RAU) with the WWAN, to cause automatic deregistration of the first GMD from the BMD and the WWAN to inform the BMD about the first GMD previously registered with the BMD now being registered directly with the WWAN.

In one alternative of the apparatus, the circuitry may be configured to control transmitting a message to the BMD indicating intent to deregister the first GMD prior to disconnecting of the first GMD from the BMD.

In one alternative of the apparatus, the circuitry may be configured to control, when the first GMD moves out of the coverage area of the BMD for a period of time $T_{cg}$, initiating a direct registration with the WWAN to obtain service at the first GMD from the WWAN.

In one alternative of the apparatus, the circuitry may be configured to control, when the first GMD moves out of the coverage of the BMD for a period of time $T_{cg}$, and the first GMD returns into the coverage area of BMD after the time period $T_{cg}$, initiating a BMD registration procedure to register with the BMD and then with the WWAN to obtain service from the WWAN; and when the first GMD enters the coverage area of the BMD after the time period $T_{cg}$ and the first GMD is directly registered with the WWAN, deregistering the first GMD with the WWAN before attempting to register the first GMD with the BMD.

In one alternative of the apparatus, the circuitry may be configured to control, when a new GMD is registered with the BMD and registration information of the first GMD is updated with the WWAN when the new GMD is registered with the WWAN by the BMD, extending a timer for periodic registration update in the first GMD.

In one alternative of the apparatus, the circuitry may be configured to control, when the first GMD is registered with the BMD, sharing capability of the first GMD with the BMD, in which the capability includes ability to operate as a given BMD, service capability, Quality of Service (QoS) supported or SRWLs supported.

In accordance with an aspect of the present disclosure, a wireless communication device may include a receiver to receive a wireless communication; and a processing device configured for sharing broadband communication services with a first client device of a plurality of client devices as Group Member Devices (GMDs) which are connectable with a base mobile device (BMD) to obtain internet service, wherein when the wireless communication device as a first GMD of the GMDs is in a coverage area of the BMD the wireless communication device can connect with and obtain internet service from the BMD through Short Range Wireless Links (SRWL) via a first modem of the BMD, and wherein when the wireless communication device is connected with the BMD via a wired connection the wireless communication device can connect and obtain the internet service from the BMD via the wired connection, wherein the processing device is configured to control, registering the wireless communication device with the BMD to obtain the interest service from the WWAN through the BMD; and when the wireless communication device is registered with the BMD, deregistering with the BMD before the wireless communication device is registered directly with the WWAN with a same identity.

In one alternative of the wireless communication device, the wireless communication device may have multiple unique identities and can connect to the WWAN directly with the same unique identity.

BRIEF DESCRIPTION OF THE DRAWINGS

FIG. 16B illustrates an MSC for the use case of registration update for a single GMD and multiple GMDs with implicit deregistration according to the aspects of the present disclosure.

DETAILED DESCRIPTION

Figure 1:
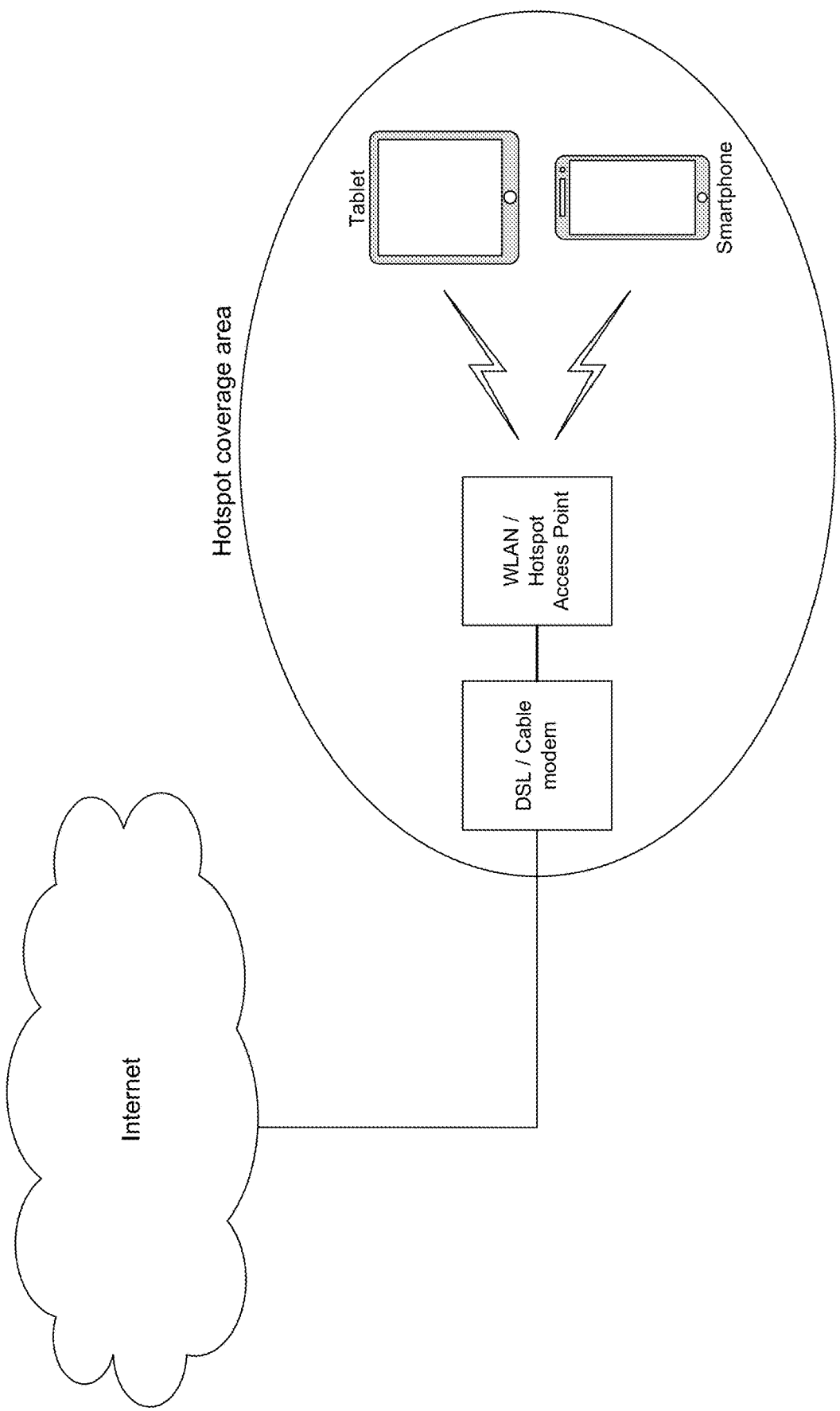
FIG. 1 illustrates an example scenario of internet access using WLAN network over a traditional wire-line internet service.

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the appended drawings, specific terminology will be used for the sake of clarity. However, the present disclosure is not intended to be limited to the specific terms used.

Although aspects of the present disclosure are illustrated using a particular type of client devices, the present disclosure is applicable to any type of client devices some of which are listed in an earlier section in the present disclosure.

Figure 9:
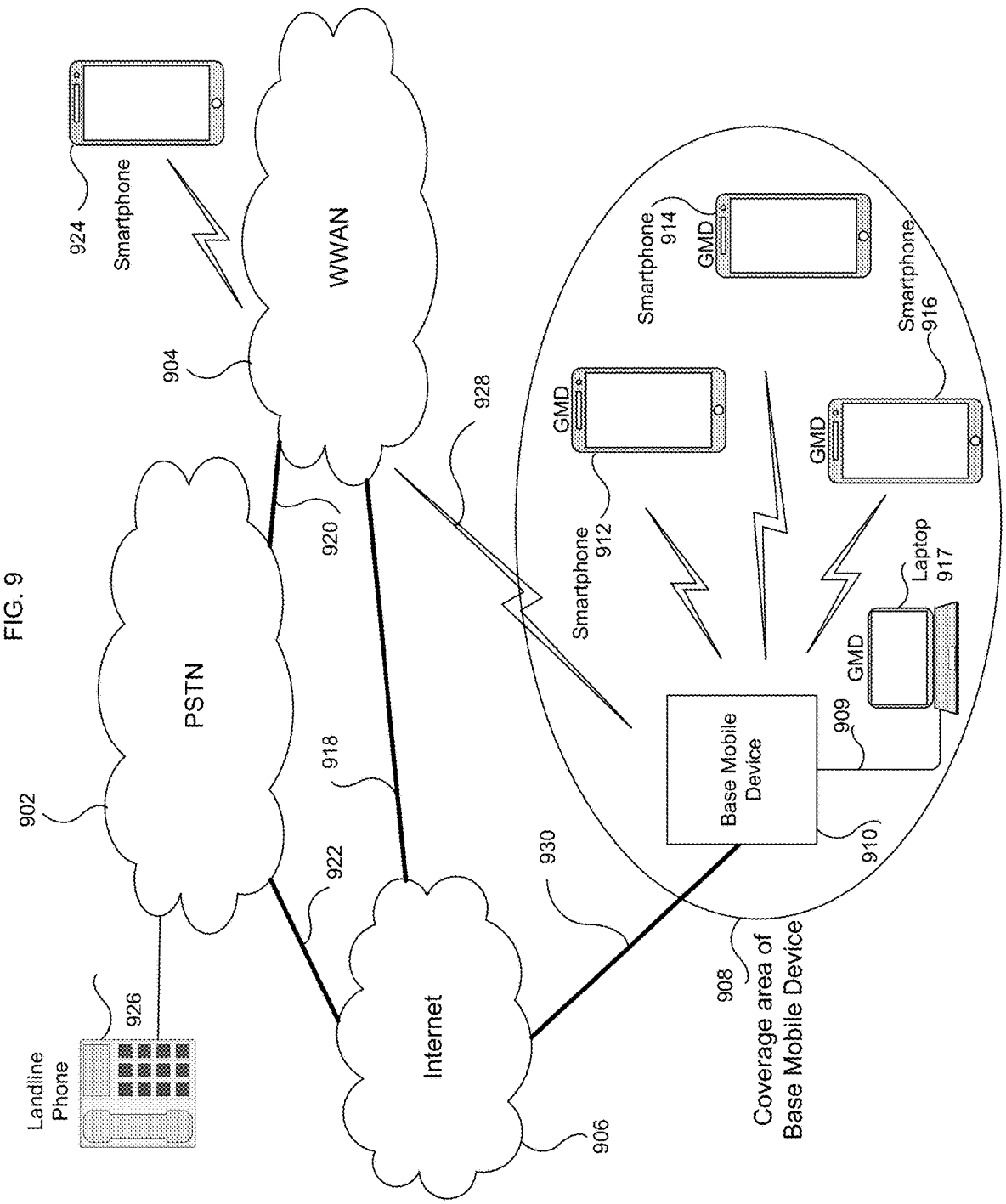
FIG. 9 illustrates a use case of Group Mobile Devices (GMDs) getting all their service including voice and video calls, SMS based text messaging and interment services from a Base Mobile Device (BMD) according to the aspects of the present disclosure.

According to an aspect of the present disclosure, a new network architecture is developed as illustrated in FIG. 9. According to an aspect of the present disclosure, a new network element, referred to herein as Base Mobile Device (BMD) 910 in FIG. 9, is defined. The BMD 910 may comprise a modem such as DSL modem to connect with the Internet through the link 930. The BMD 910 may comprise a modem for a WWAN. The BMD 910 may perform authentication and registration with the WWAN to be able to access all the services available from the wireless network. The BMD may also comprise a modem for one of the Short Range Wireless Links (SRWL) such as WLAN. For example, the BMD may act as an Access Point for providing internet service over SRWL to the client devices that may be present in its coverage area 908. A client device that is able to connect and get internet service from the BMD is referred to herein as Group Member Device (GMD). For example, the Smartphones 912, 914 and 916 and the laptop 917 are the GMDs. The BMD may connect with the GMDs through the SRWL such as WLAN. The BMD may also connect with the GMDs through the wired connection such as Ethernet LAN 909. Example use cases of GMDs may be some or all the client devices in a home, some or all the client devices in a small office, or some or all the client devices in a mobile vehicle, etc.

According to an aspect of the present disclosure, the BMD may accept and/or support connections from different GMDs using different SRWL technologies.

According to an aspect of the present disclosure, the GMDs may be connected to BMD through a wired connection such as using an Ethernet LAN cable. For example, the BMD may be a customer premises equipment (CPE) router and a GMD such as a laptop or similar such device with WWAN service may enter the BMD coverage area and get connected to BMD through an Ethernet LAN cable.

According to an aspect of the present disclosure, all the GMDs may have their own unique identity such as a mobile phone number that is addressable by a BMD and by the WWAN. There may be some other identity used by the GMDs such as an IP address, a more descriptive identity such as user name, etc. that is addressable by a BMD and by the WWAN. According to an aspect of the present disclosure, a BMD may have multiple unique identities such as a mobile phone number and an IP address and a more descriptive identity such as user name, etc. that may be commonly addressable by the GMDs and by the WWAN. According to an aspect of the present disclosure, the GMDs may have multiple unique identities such as a mobile phone number and an IP address. According to an aspect of the present disclosure, the GMDs may have capability to connect to the WWAN directly with the same unique identity. The GMD Smartphones 912, 914, and 916 may have the capability to establish connection and perform registration directly with the WWAN. According to an aspect of the present disclosure, if a GMD was already registered with the BMD, then it may first deregister with the BMD before it registers directly with the WWAN with the same identity.

According to an aspect of the present disclosure, the BMD 910 may establish a connection with the WWAN 904 over the wireless interface 928. According to an aspect of the present disclosure, among the BMD and all the GMDs, the BMD may be the only device getting the service directly from the WWAN. According to an aspect of the present disclosure, each GMD, which connects with the BMD, may perform a local registration using its unique identity with the BMD. According to an aspect of the present disclosure, whenever a GMD registers with a BMD, the BMD may register to the network the identity of the GMDs which are registered with the BMD. According to an aspect of the present disclosure, whenever a BMD performs other WWAN related procedures such as Location Area Update (LAU), Tracking Area Update (TAU), Routing Area Update (RAU) or similar update mechanisms that may be required by the WWAN, the BMD may perform the LAU, TAU, RAU, etc. for its own identity and also for the identities of all the GMDs registered with the BMD.

According to an aspect of the present disclosure, the GMDs may be registered to the BMD for service over the SRWL only and may not require the BMD to register those GMDs to the WWAN. According to an aspect of the present disclosure, when the BMD performs WWAN related procedures such as LAU, TAU, RAU or similar update mechanisms that may be required by the WWAN, the BMD may not perform the LAU, TAU, RAU, etc. for some of the GMDs that are registered with the BMD but not requiring registration with WWAN.

According to an aspect of the present disclosure once a GMD is registered with a BMD, all the services such as voice and video calls, SMS based text messaging, internet, etc. may be provided by the WWAN to the GMD through the BMD. For example, an IMS/SIP based VoIP call to a GMD Smartphone 912 from Smartphone 924 may be routed by the WWAN 904 through the BMD 910. The user of a GMD Smartphone 914 may access the internet through the BMD 910. A GMD Smartphone 916 user may make calls to the landline phone 926 through the BMD 910, then through the WWAN 904 and the PSTN 902. According to the aspect of the present disclosure the voice and video calls or SMS based text messaging from the WWAN network addressed to GMDs that are registered with the BMD will be first terminated at the BMD which will direct the VoIP call or text messaging to the respective GMD based on the GMD identity provided by the network in the call termination. According to the aspect of the present disclosure the GMDs can originate a voice or video call or SMS based text messaging with the WWAN network through the BMD. When the GMD originate a voice or video call or SMS based text message it may first terminate at the BMD and then BMD may initiate or may route the voice or video call or SMS based text messaging with the WWAN.

Figure 10:
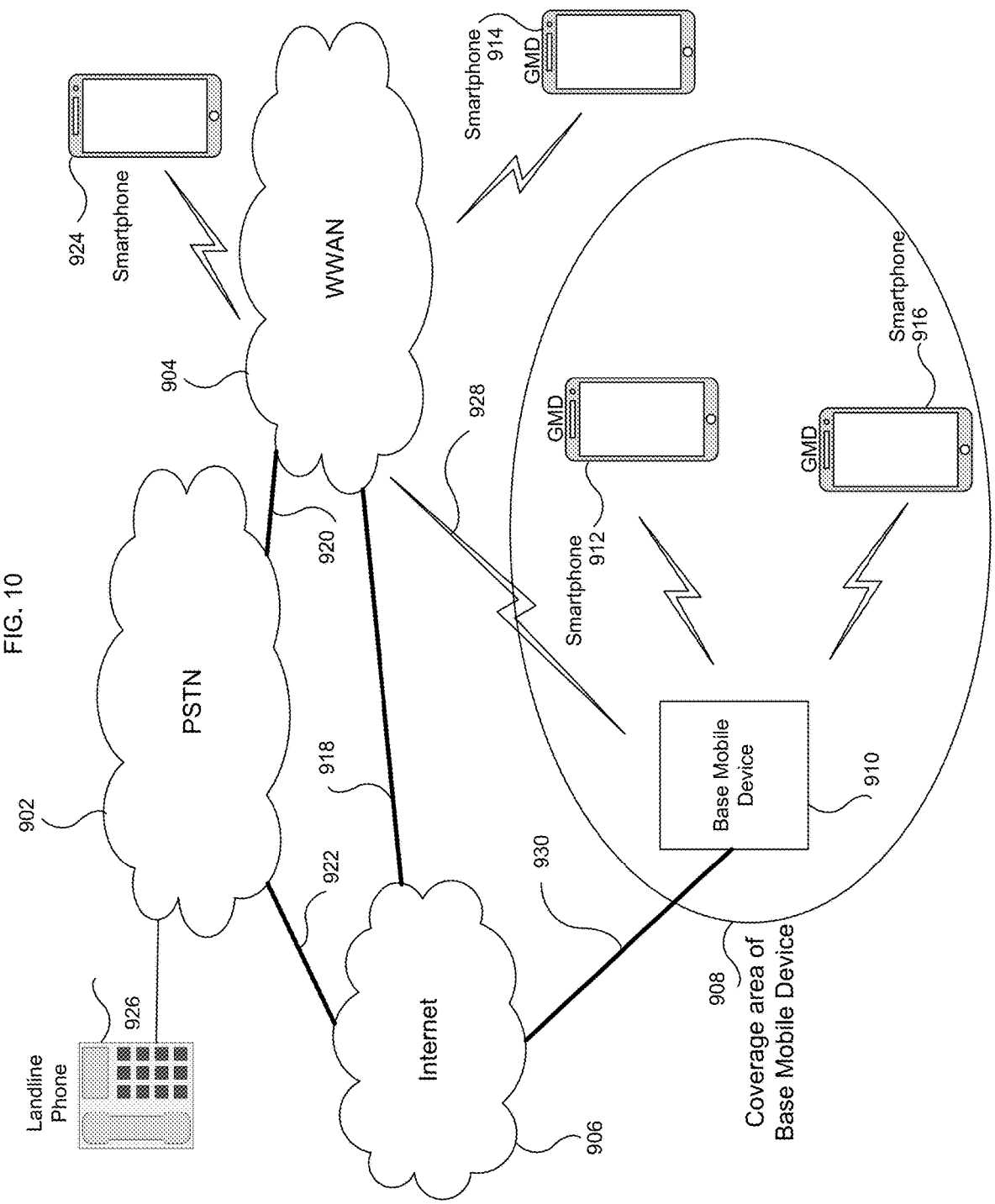
FIG. 10 illustrates a use case of a GMD switching its service from a BMD to a WWAN according to the aspects of the present disclosure.
Figure 11:
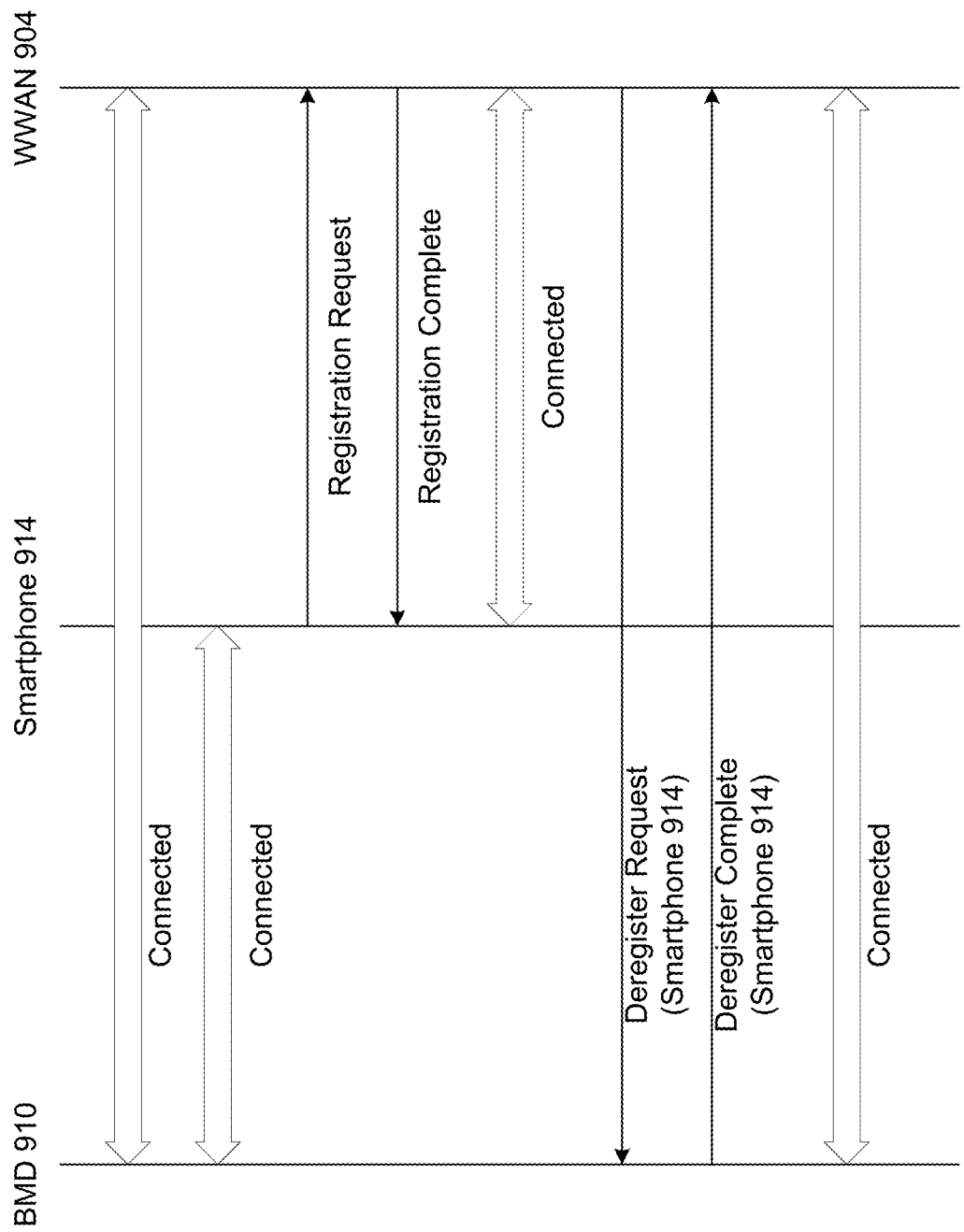
FIG. 11 illustrates a Message Sequence Chart (MSC) for the use case of a GMD switching its service from a BMD to a WWAN according to the aspects of the present disclosure.

According to an aspect of the present disclosure, when a GMD is near the edge of the coverage area of a BMD or the user of the GMD decides not to be connected with a BMD, it may get the service from the WWAN directly as illustrated in FIG. 10. The Smartphone 914 has moved out of the coverage area of the BMD 910 and it has connected with the WWAN 904 directly. The Smartphone 914 is no longer considered a GMD by the BMD 910. According to an aspect of the present disclosure, a GMD that intends to disconnect from a BMD, may first initiate a LAU, TAU, RAU, or similar such registration procedure with the WWAN which in turn may automatically trigger deregistration from the BMD to which it was previously registered. According to an aspect of the present disclosure, the WWAN may inform the BMD about the GMD that was previously registered with the BMD is now registered directly with the WWAN. This process is illustrated by the Message Sequence Chart (MSC) in FIG. 11 where the Smartphone 914 is initially connected to the BMD 910 which in turn is connected to the WWAN 904. Next the Smartphone 914 initiates a registration with WWAN 904 by sending a Registration Request message to it. The WWAN 904 responds with a Registration Complete message to the Smartphone 914. At this point the Smartphone 914 is fully connected to the WWAN 904 and able to avail all the services from it. The WWAN 904 sends a Deregister Request message to the BMD 910 to deregister the Smartphone 914. The BMD 910 responds with a Deregister Complete message to the WWAN 904. At this point the BMD 910 and the WWAN 904 remain connected to continue to provide service to other GMDs served by the BMD 910.

Figure 12:
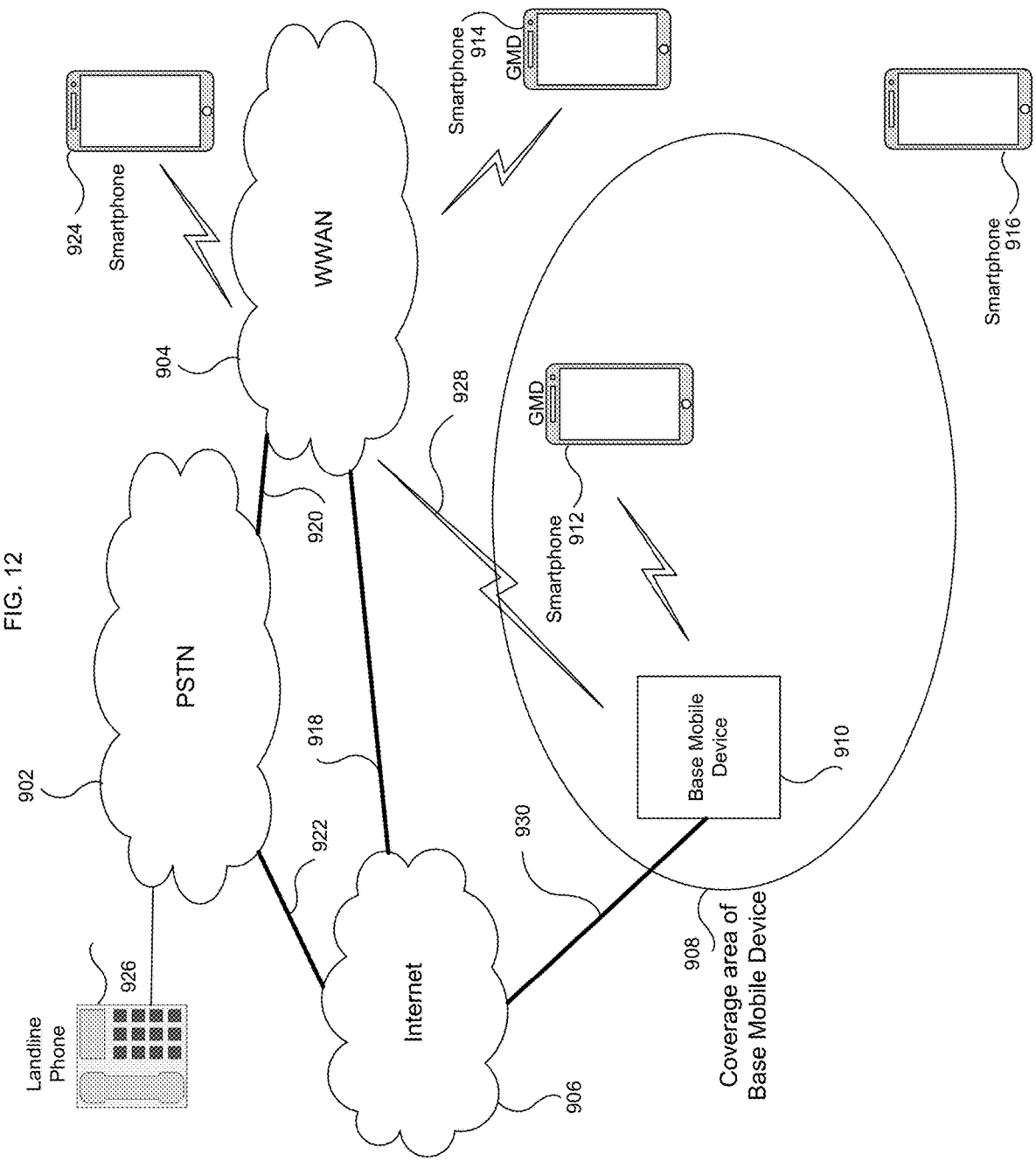
FIG. 12 illustrates a use case of a GMD losing its service from a BMD and not having a service from WWAN according to the aspects of the present disclosure.
Figure 13:
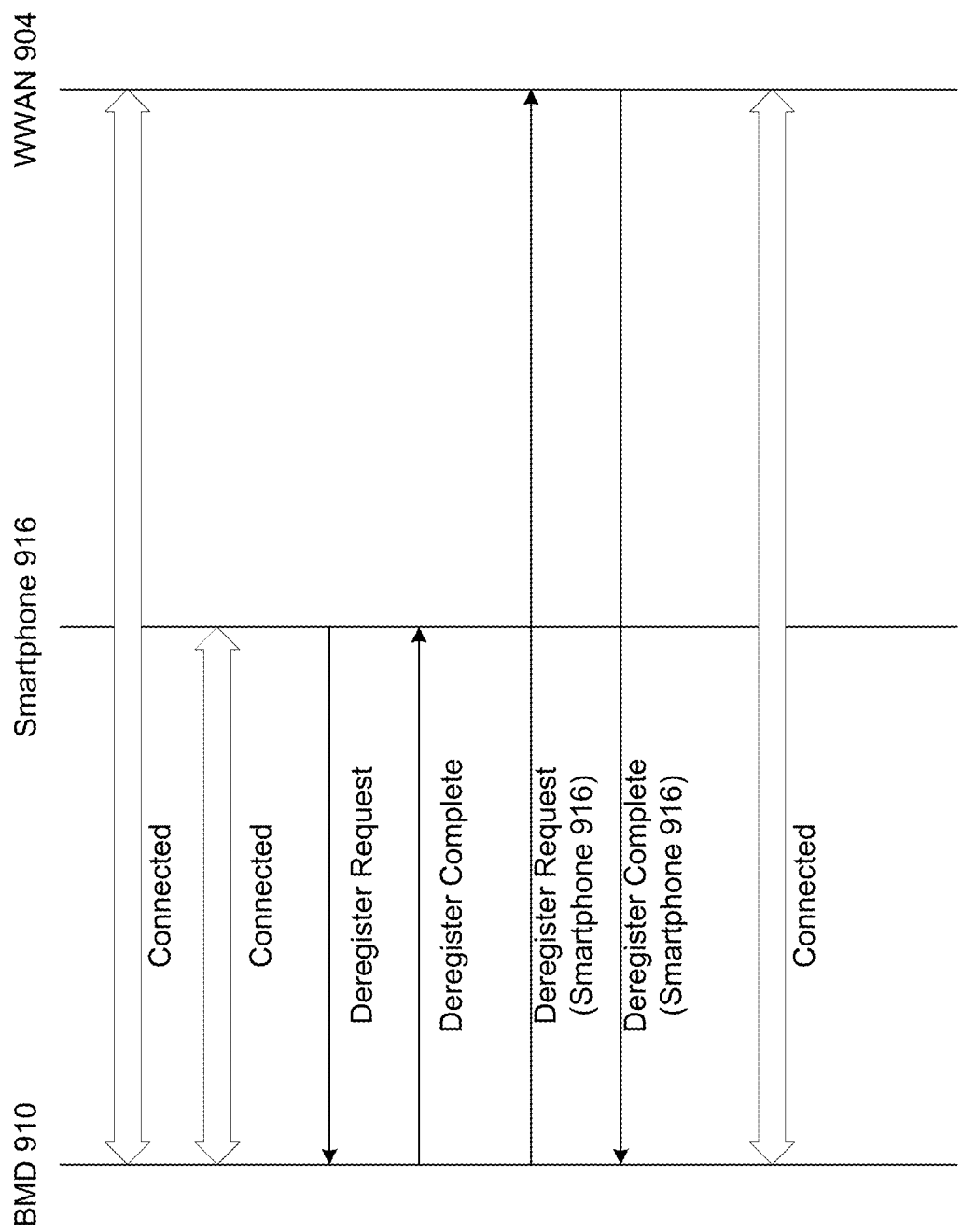
FIG. 13 illustrates an MSC for the use case of a GMD losing its service from a BMD and not having a service from WWAN according to the aspects of the present disclosure.

In some scenarios, a GMD may disconnect or deregister from a BMD and yet not necessarily connect to the WWAN directly. This scenario is illustrated in FIG. 12 for the example case where the Smartphone 916 has moved out of the coverage area of the BMD 910. According to an aspect of the present disclosure, a GMD may send a message to the BMD indicating its intent to deregister prior to disconnecting from the BMD. According to an aspect of the present disclosure, whenever a GMD deregisters with the BMD, the BMD may perform an LAU, TAU, RAU, or other similar update to indicate to the WWAN that one of the previously registered GMDs has now deregistered from the BMD. This process is illustrated by the MSC in FIG. 13 where the Smartphone 916 is initially connected to the BMD 910 which in turn is connected to the WWAN 904. The Smartphone 916 sends a Deregister Request message to the BMD 910 which responds with the Deregister Complete message in response. The BMD 910 sends a Deregister Request message for the Smartphone 916 to the WWAN 904 which responds with a Deregister Complete message. At this point, the Smartphone 916 is disconnected from the BMD 910 but the BMD 910 and the WWAN 904 remain connected to continue to provide service to other GMDs served by the BMD 910.

According to an aspect of the present disclosure, when the BMD detects a registered GMD going out of the coverage area and if the GMD does not come back into the BMD coverage area for a period of time $T_{cb}$, then the BMD may send a GMD Deregister Request message to the WWAN to deregister the GMD. The method by which the BMD detects the GMD is in its coverage area depends on the particular SRWL technology used for the wireless connection between the GMD and the BMD. The time $T_{cb}$ can be determined by simulations and experiments and it may be configured to the BMD. The value of $T_{cb}$ may be different for different SRWL technologies used for the wireless connection between the BMD and the GMD. When the BMD detects the GMD after the time $T_{cb}$, then it may expect the GMD to initiate a new registration request to get the GMD registered back with the BMD and the WWAN.

According to an aspect of the present disclosure, when an already registered GMD moves out of the coverage area of a BMD to which it is registered for a period of time $T_{cg}$ then the GMD may initiate a direct registration with WWAN to continue to get direct service from WWAN. The method by which the GMD detects if it is in the BMD coverage area may depend on the particular SRWL technology used for the wireless connection between the GMD and the BMD. The time $T_{cg}$ may be determined by simulations and experiments. The time $T_{cg}$ may be configured to the GMD and it may be different for different SRWL technologies used in the wireless connection between BMD and the GMD.

According to an aspect of the present disclosure, when the GMD moves out of the coverage area of a BMD to which it is registered for a period of time $T_{cg}$ and then if the GMD comes back into the coverage area of BMD after the time period $T_{cg}$ then the GMD may initiate the BMD registration procedure to get registered with the BMD and then with the WWAN to obtain service from WWAN. When the GMD enters the coverage area of the BMD after $T_{cg}$ and if the GMD is directly registered with WWAN at the time then it may deregister with WWAN before it attempts to register with the BMD.

According to an aspect of the present disclosure, if the GMD is powering down then it may send a deregistration request to the BMD notifying that it is powering down and the BMD may initiate a GMD deregistration update request to the WWAN with the powering down notification for the GMD.

Figure 14:
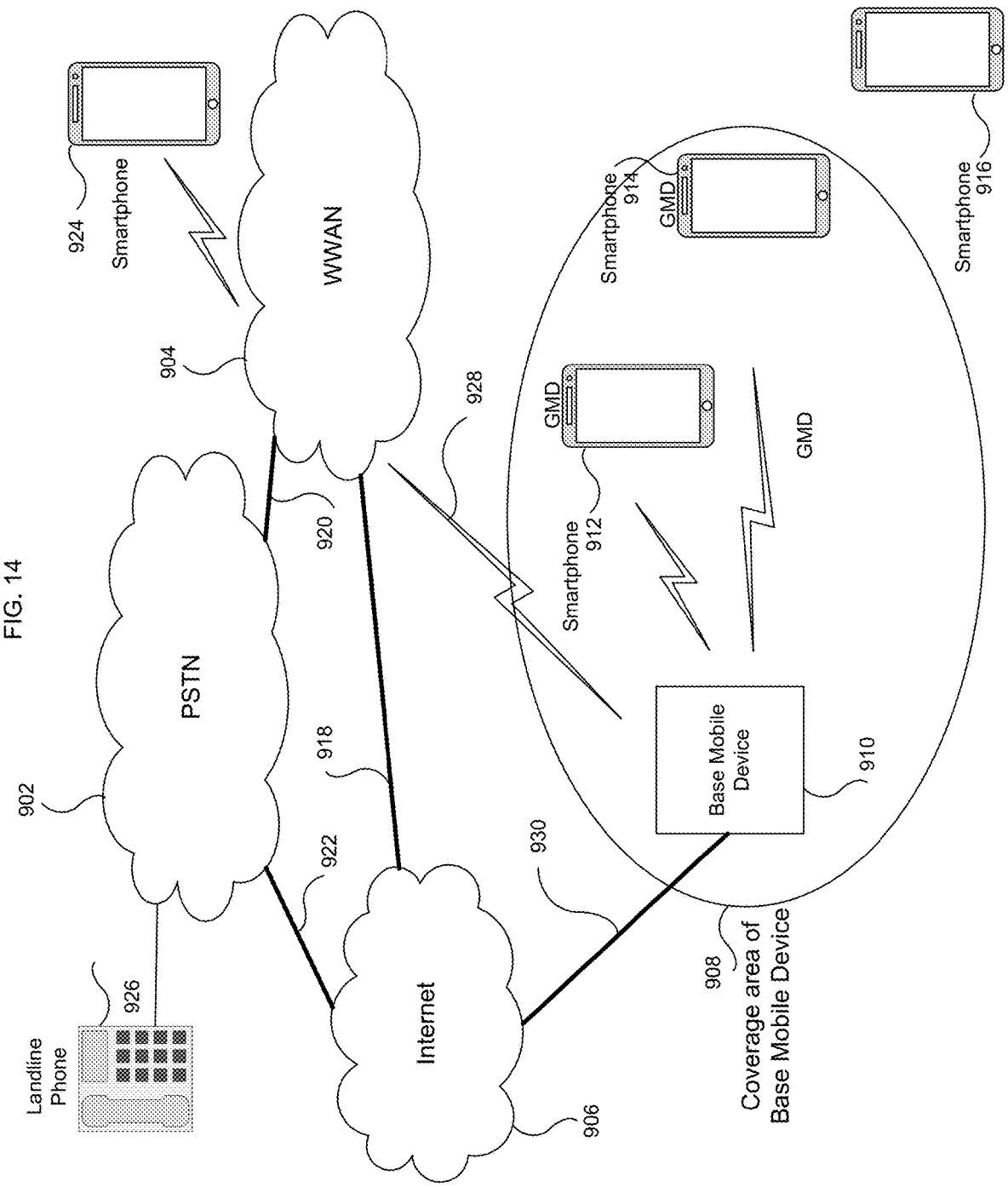
FIG. 14 illustrates a use case of a GMD switching its service from a WWAN to a BMD according to the aspects of the present disclosure.
Figure 15:
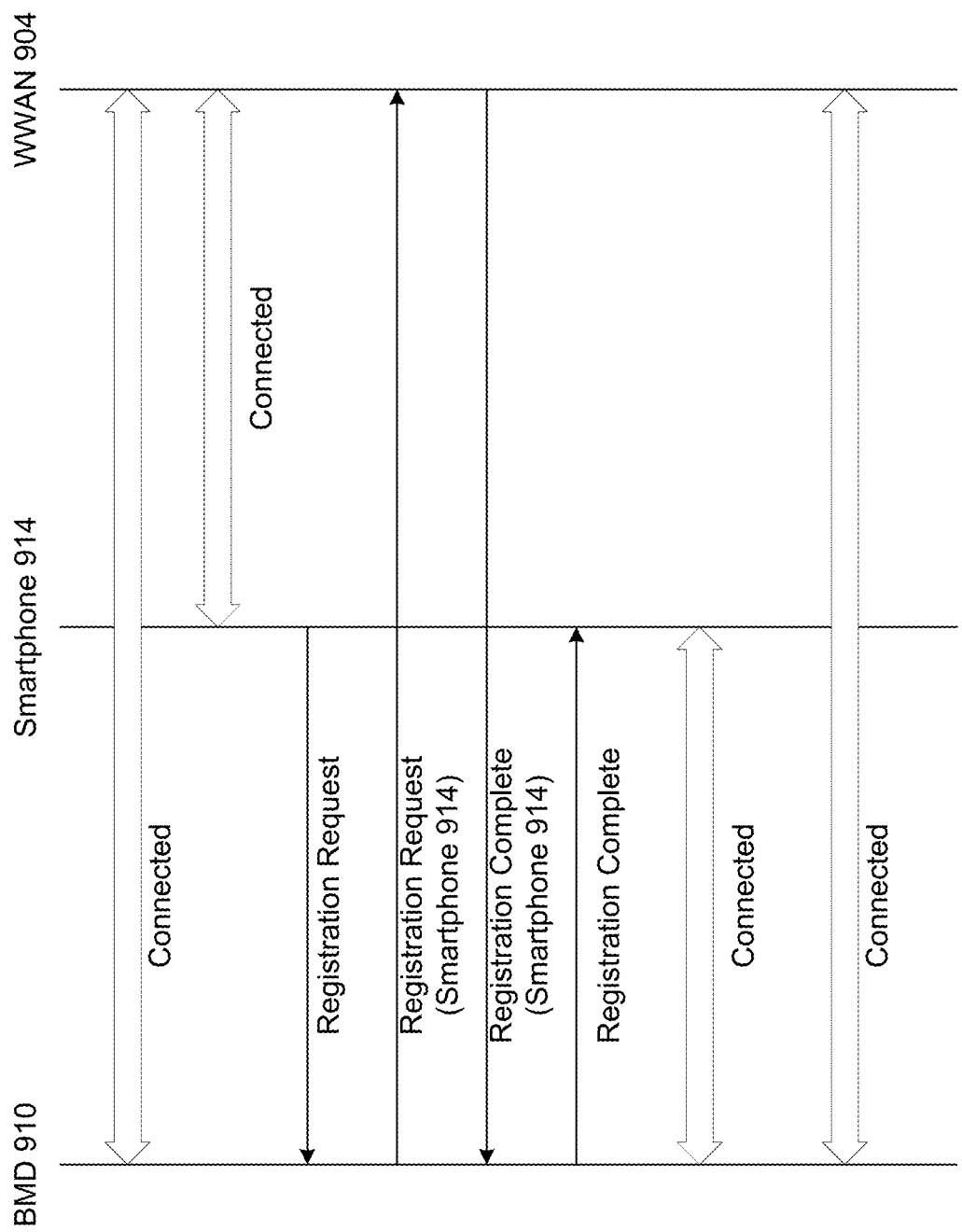
FIG. 15 illustrates an MSC for the use case of a GMD switching its service from a WWAN to a BMD according to the aspects of the present disclosure.

According to an aspect of the present disclosure, when a client device that is already connected to a WWAN 904 enters the coverage area of a BMD and detects that the BMD offers the required services and access to the BMD is allowed, it may register with the BMD and become a GMD for that BMD. This scenario is illustrated in FIG. 14 where the Smartphone 914 which is connected to WWAN 904 enters the BMD 910 coverage area. According to an aspect of the present disclosure, the BMD 910 may inform the WWAN 904 about the GMD Smartphone 914 being registered to it. This process is illustrated by MSC in FIG. 15 where the Smartphone 914 is initially connected to the WWAN 904 and the BMD 910 is also connected to the WWAN 904. When the Smartphone 914 detects the BMD 910 and determines to get service from it, the Smartphone 914 sends a Registration Request message to the BMD 910. The BMD 910 in turn sends a Registration Request message for the Smartphone 914 to the WWAN 904. The WWAN 904 in turn sends a Registration Complete message for the Smartphone 914 to the BMD 910. The BMD 910 then sends the Registration Complete message to the Smartphone 914. At this point the Smartphone 914 is connected to the BMD 910 and is able to get all the services from the WWAN 904 through the BMD 910. Alternatively, according to the aspect of the present disclosure, the Smartphone 914 may inform the WWAN 904, prior to registering to BMD 910 that it is switching over to the BMD 910 for all the services.

Figure 16A:
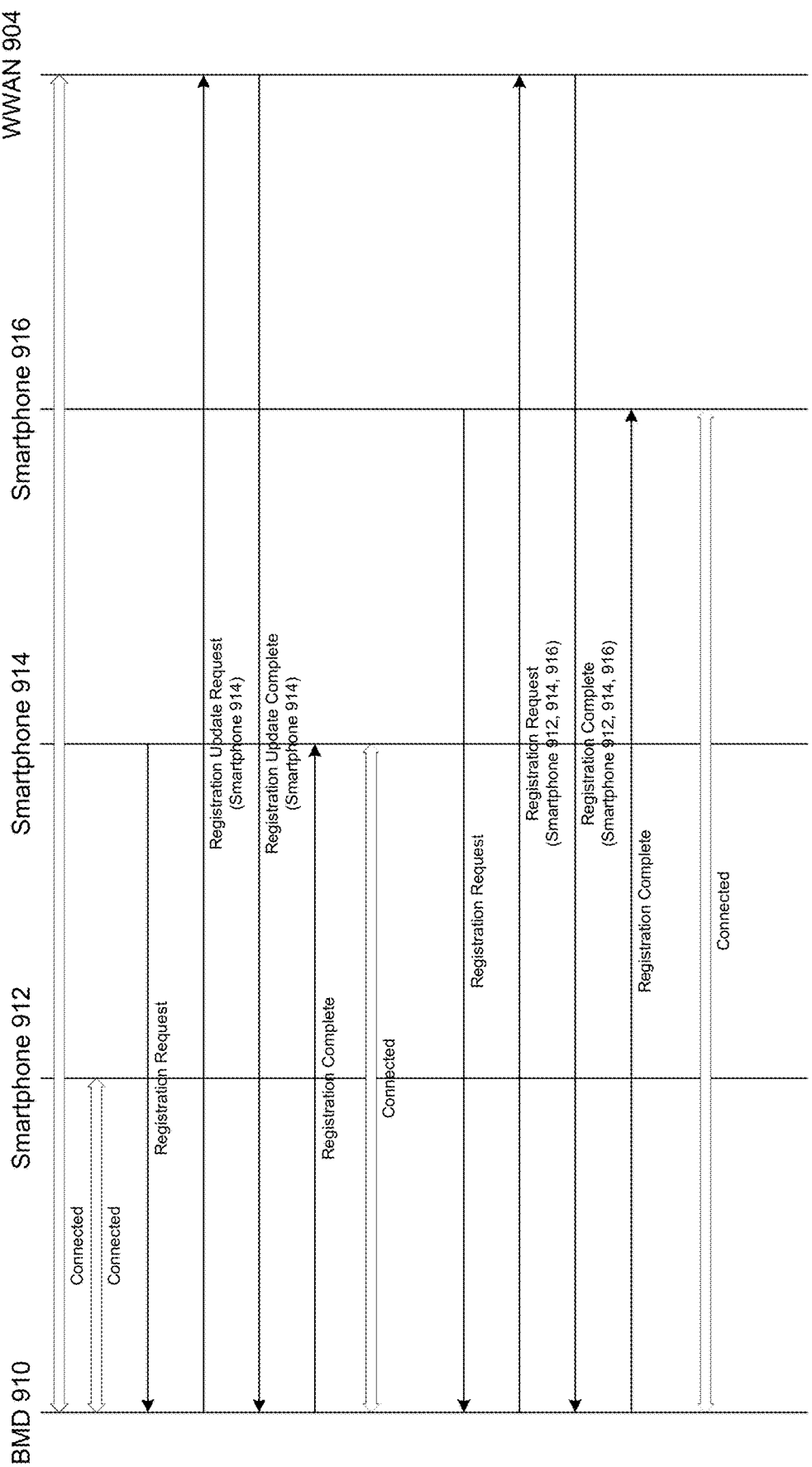
FIG. 16A illustrates an MSC for the use case of registration update for a single GMD and multiple GMDs according to the aspects of the present disclosure.

According to an aspect of the present disclosure whenever a new GMD registers with a BMD, the BMD may perform registration update to the WWAN only for the newly registered GMD. According to an aspect of the present disclosure, whenever a new GMD registers with the BMD, the BMD may perform registration update to the WWAN for all the registered GMDs by sending the already registered GMD identifiers (IDs) to the WWAN. According to an aspect of the present disclosure, the WWAN may accept the GMDs registration update for all or one or multiple GMDs whose identities are sent by the BMD in the GMD registration message. Some of these scenarios are illustrated by an MSC in FIG. 16A where initially the GMD smartphone 912 is connected to the BMD 910 and is registered to the WWAN. Next the GMD Smartphone 914 initiates a registration request to the BMD 910. The BMD 910 sends a Registration Request message for the Smartphone 914 to the WWAN 904. Next the WWAN 904 sends the Registration Complete message for GMD Smartphone 914 to the BMD 910 which in turn sends the Registration Complete message to the GMD Smartphone 914. At this point the Smartphone 914 is connected to the BMD 910 and is able to get all the services from the WWAN 904 through the BMD 910. Next the GMD Smartphone 916 initiates a registration request to the BMD 910. The BMD 910 sends a Registration Request message and includes the identities for the Smartphone 916 and the two previously registered GMDs Smartphone 912 and Smartphone 914 to the WWAN 904. Next the WWAN 904 sends the Registration Complete message to the GMD 910 and includes the identities of the newly registered GMD Smartphone 916 and the two previously registered GMDs Smartphone 912 and Smartphone 914. The BMD 910 sends the Registration Complete message to the GMD Smartphone 916 and to the GMDs Smartphone 912 and Smartphone 914. At this point the Smartphone 916 is connected to the BMD 910 and is able to get all the services from the WWAN 904 through the BMD 910. According to an aspect of the present disclosure, the timers in the GMDs Smartphone 912 and Smartphone 914 for periodic registration update may be extended since the registration is already updated as part of the registration for the new GMD Smartphone 916.

The MSC in FIG. 16B illustrates the scenario where the WWAN may implicitly deregister previously registered GMDs. As illustrated in FIG. 16B, initially the GMD Smartphone 912 is connected to the BMD 910 and is registered to the WWAN. Next the GMD Smartphone 914 initiates a registration request to the BMD 910. The BMD 910 sends a Registration Request message for the Smartphone 914 and Smartphone 912 to the WWAN 904. Next the WWAN 904 sends the Registration Complete message for GMD Smartphone 914 to the BMD 910 which in turn sends the Registration Complete message to the GMD Smartphone 914. At this point the Smartphone 914 is connected to the BMD 910 and is able to get all the services from the WWAN 904 through the BMD 910. According to an aspect of the present disclosure, since the Registration Request message from the BMD 910 included the Smartphone 912 but it was not included by the WWAN in the Registration Complete, it implicitly indicates the deregistration of the GMD Smartphone 912. The GMD Smartphone 912 may remain locally connected to the BMD 910.

Figure 17:
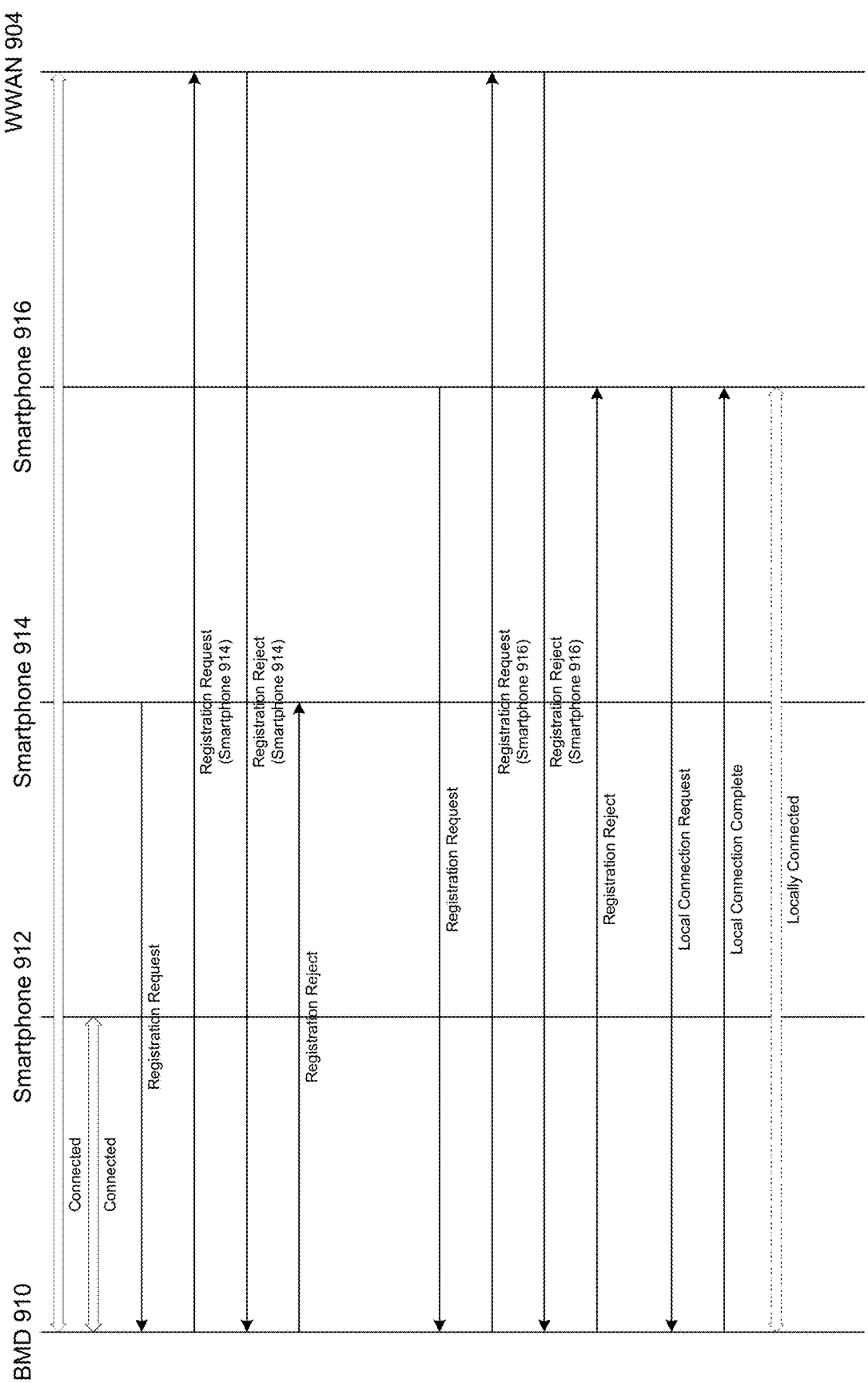
FIG. 17 illustrates an MSC for the use case of registration rejection for a GMD and successful local internet connection between BMD and GMD according to the aspects of the present disclosure.

According to an aspect of the present disclosure, the WWAN may reject registration for one or more GMDs from the GMD list sent by the BMD in the GMD registration request to the WWAN. According to an aspect of the present disclosure when the BMD receives a Registration Reject message for a GMD from the WWAN then the BMD may send the WWAN Registration Reject message to the GMD and remove it from the BMD WWAN registration list. According to an aspect of the present disclosure when the BMD sends the WWAN Registration Reject message to the GMD, the BMD may deny the connection and/or the Internet service to the GMD and may disconnect the SRWL with the GMD. According to an aspect of the present disclosure when the BMD sends the WWAN Registration Reject message to the GMD, the BMD may still continue to provide Internet service to the GMD through the SRWL but the GMD may not able to obtain direct service from WWAN such as directed voice call, SMS, etc. These scenarios are illustrated by an MSC in FIG. 17 where initially the GMD Smartphone 912 is connected to the BMD 910 and is registered to the WWAN. Next the GMD Smartphone 914 initiates a registration request to the BMD 910. The BMD 910 sends a Registration Request message for the Smartphone 914 to the WWAN 904. Next the WWAN 904 sends the Registration Reject message for GMD Smartphone 914 to the BMD 910 which in turn sends the Registration Reject message to the GMD Smartphone 914. At this point the GMD Smartphone 914 is not connected to the WWAN 904. Furthermore, the BMD 910 may disconnect the GMD Smartphone 914 from the SRWL. Next the GMD Smartphone 916 initiates a registration request to the BMD 910. The BMD 910 sends a Registration Request message and includes the identity for the Smartphone 916 to the WWAN 904. Next the WWAN 904 sends the Registration Reject message to the BMD 910. The BMD 910 sends the Registration Reject message to the GMD Smartphone 916. At this point the Smartphone 916 is not connected to the WWAN 904 and is not able to get services such as directed voice call, SMS, etc. Next GMD Smartphone 916 initiates a request to the BMD 910 to get a local internet connection by sending the Local Connection Request. Next the BMD 910 responds with a Local Connection Complete message. At this point the GMD Smartphone 916 is able to get internet service from the BMD 910 which in turn may be getting internet service using WWAN 904, using DSL, etc.

Figure 6:
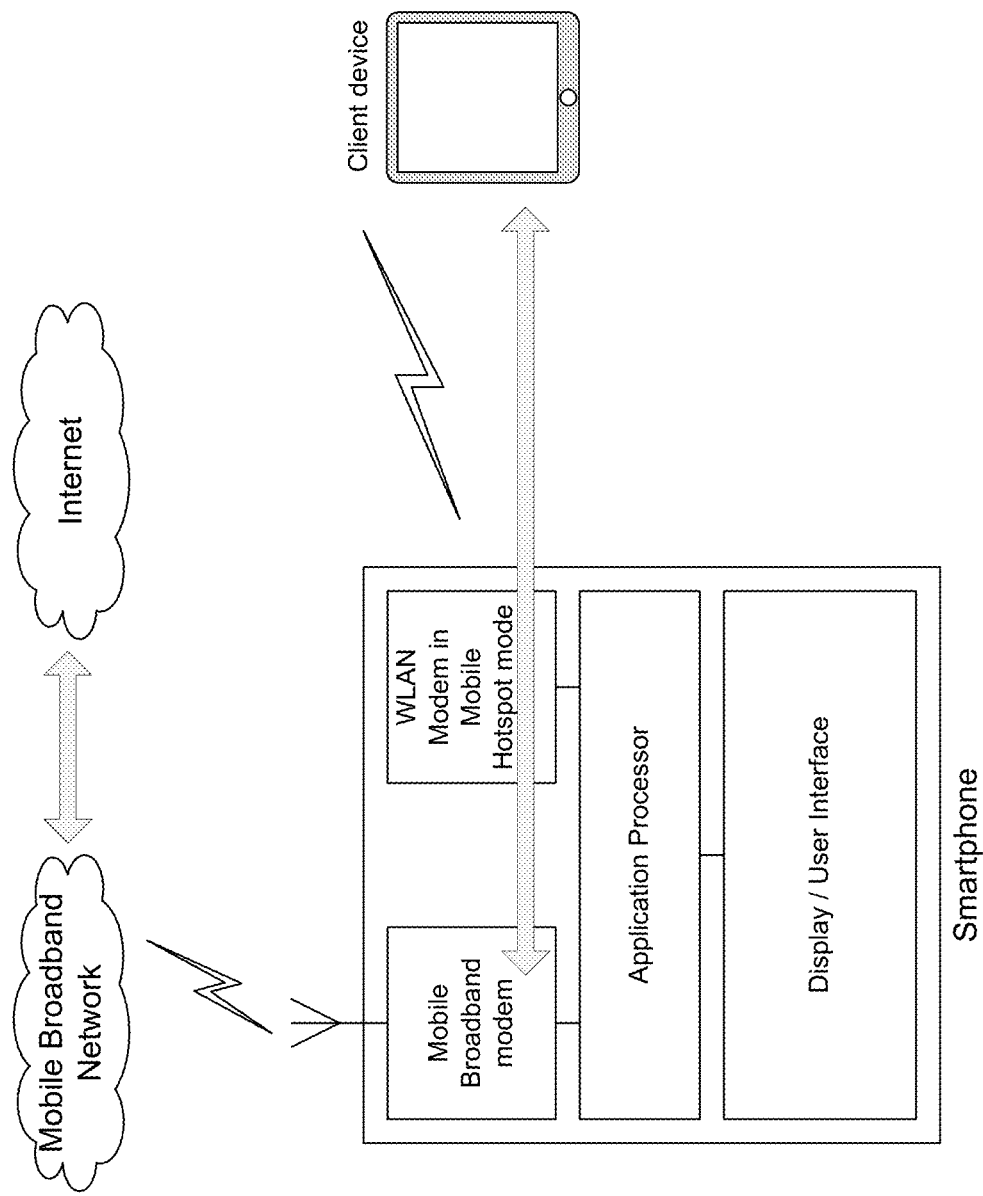
FIG. 6 illustrates a use case of internet access over a WLAN network by a client device through a smartphone operating in mobile Hotspot mode.
Figure 7:
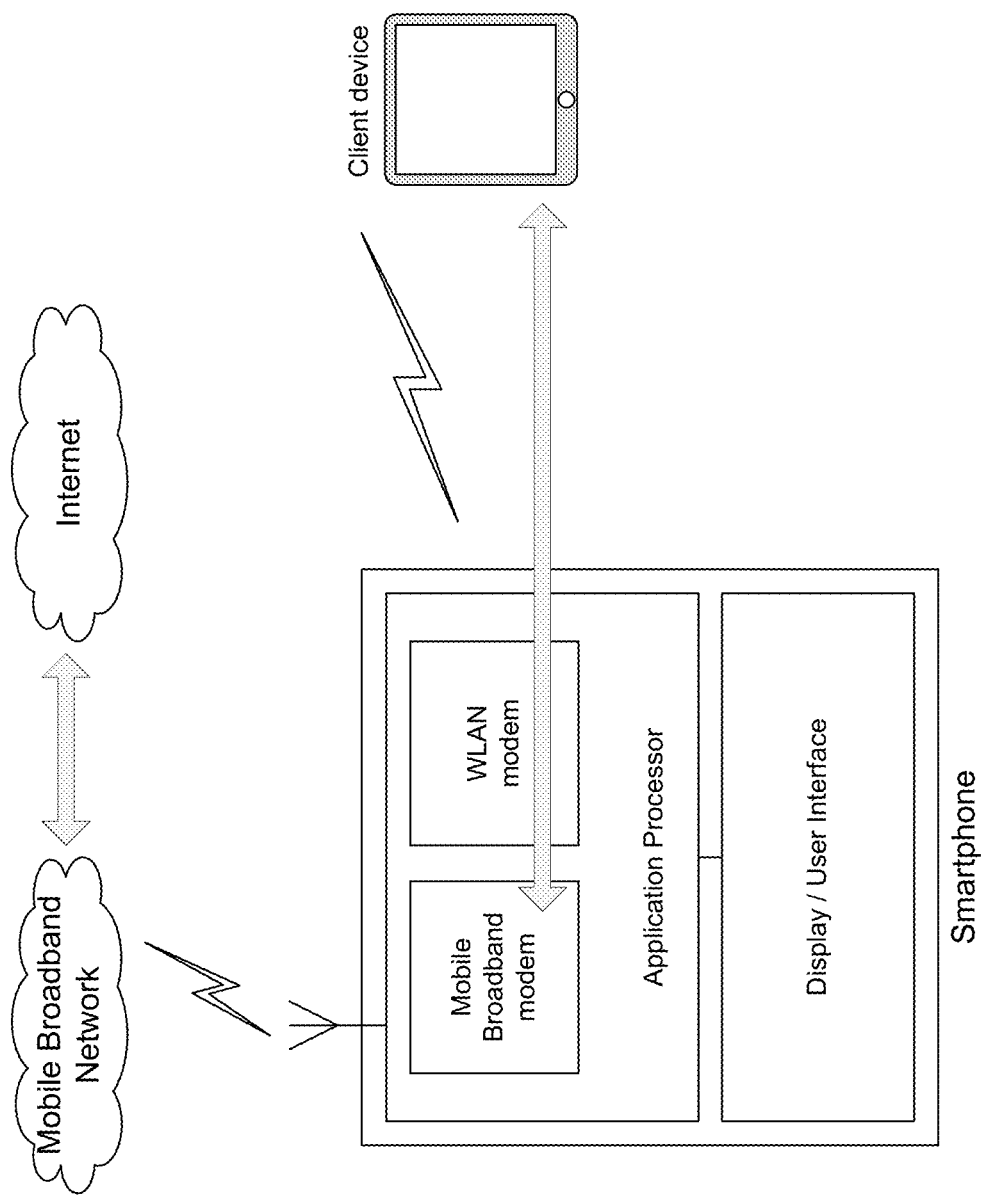
FIG. 7 illustrates a use case of internet access over a WLAN network by a client device through a smartphone operating in mobile Hotspot mode with an integrated mobile broadband modem, WLAN Access Point, and Application Processor.
Figure 8:
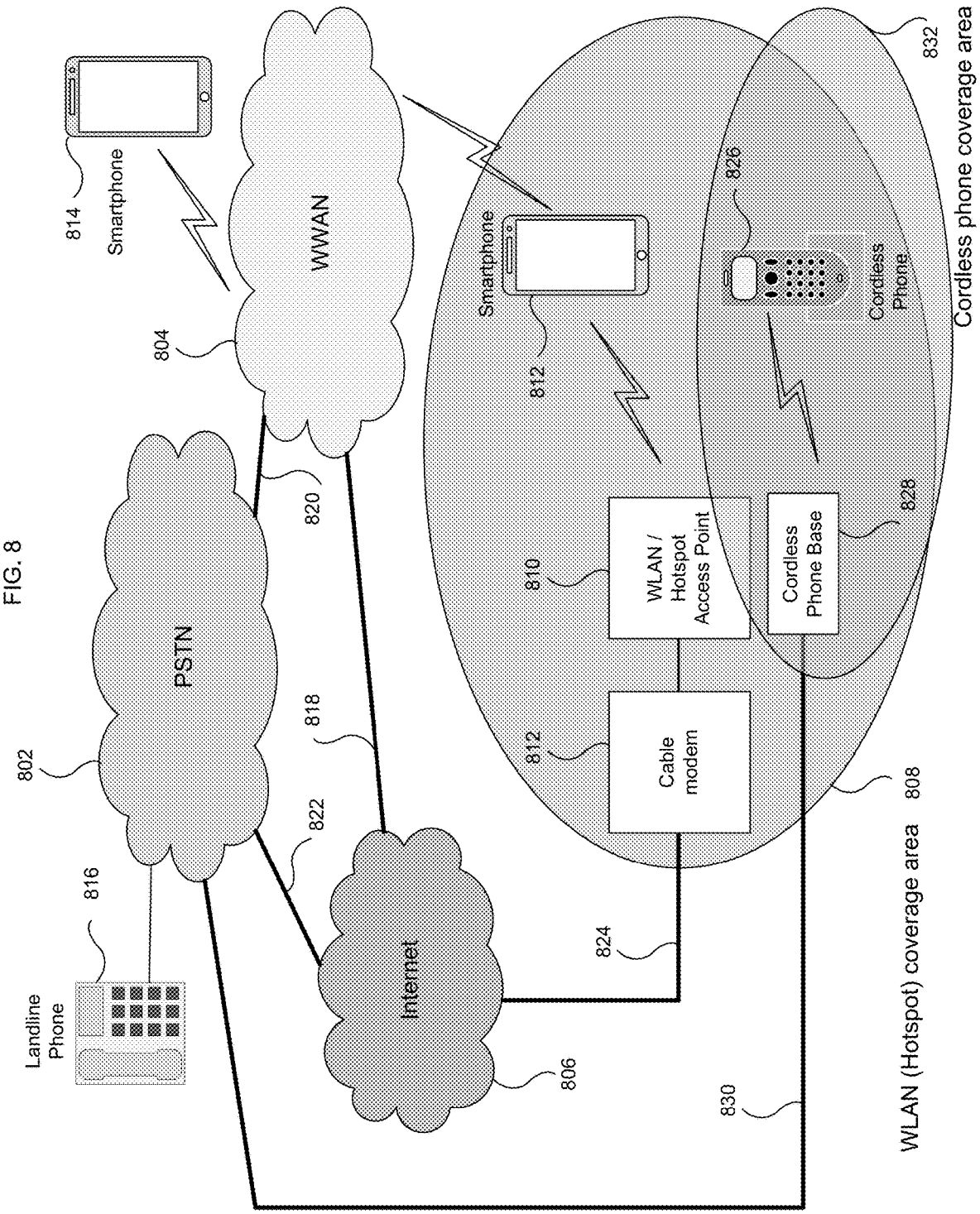
FIG. 8 illustrates a use case of a Smartphone simultaneously connected to different networks for different services.

According to an aspect of the present disclosure the BMD may broadcast its capabilities in a periodic manner say every time period $T_p$ where the GMD in its coverage area gets notified about its arrival and availability and its capabilities to provide the routed WWAN services to the GMDs According to an aspect of the present disclosure, some GMDs may be able to serve as a BMD, such as in, for example, the scenario illustrated in FIG. 6 where a Smartphone is serving as a mobile Hotspot. In a similar manner, some GMDs may include the required hardware and software capability to function as a BMD. However, only a single device can be a BMD in a group of client devices and all the GMDs must be registered to one and only one BMD at a given time.

According to an aspect of the present disclosure when the GMD registers with the BMD, the GMD may share its capability which includes its ability to operate as BMD, service capability, Quality of Service (QoS) supported, SRWLs supported, etc.

According to an aspect of the present disclosure, a BMD may be a mobile device, i.e., the BMD need not be a fixed non-portable device. According to an aspect of the present disclosure, when a client device that is serving as a BMD needs to move out of its present serving area for the GMDs, or if the device currently serving as BMD needs to transfer the registered GMD ownership to another device, then the BMD may transfer the registration context to another GMD which may have the BMD capability. The GMD context may include various identities, capabilities, service attributes, security credentials, etc. One example scenario for the required steps is described next. Let $BMD_c$ denote the currently serving BMD. Let $BMD_n$ denote the next potential BMD that may be used as serving BMD.

Step 1. First the $BMD_c$ may identify the next potential $BMD_n$ from the group of GMDs. This may be done, for example, by $BMD_c$ sending a broadcast message soliciting request to change BMD. Then from the received responses, it may select one of the GMDs as the $BMD_n$.

Step 2. The $BMD_c$ can initiate a three way handshake procedure between $BMD_c$, $BMD_n$ and the WWAN to transfer all the GMD contexts with the $BMD_c$ and the WWAN to the $BMD_n$.

Step 3. Once the contexts are transferred, the GMDs may be notified of the new $BMD_n$ and the GMDs may register with $BMD_n$.

Step 4. Upon successful transfer of contexts from $BMD_c$ to $BMD_n$, the $BMD_c$ may deregister its BMD status with the WWAN and may either become a GMD for $BMD_n$ or may register directly with the WWAN as a standalone device.

Step 5. The $BMD_n$ may become the new $BMD_c$ and may coordinate the network registration and deregistration, LAU, TAU, etc. for the current and any new GMDs.

Figure 18:
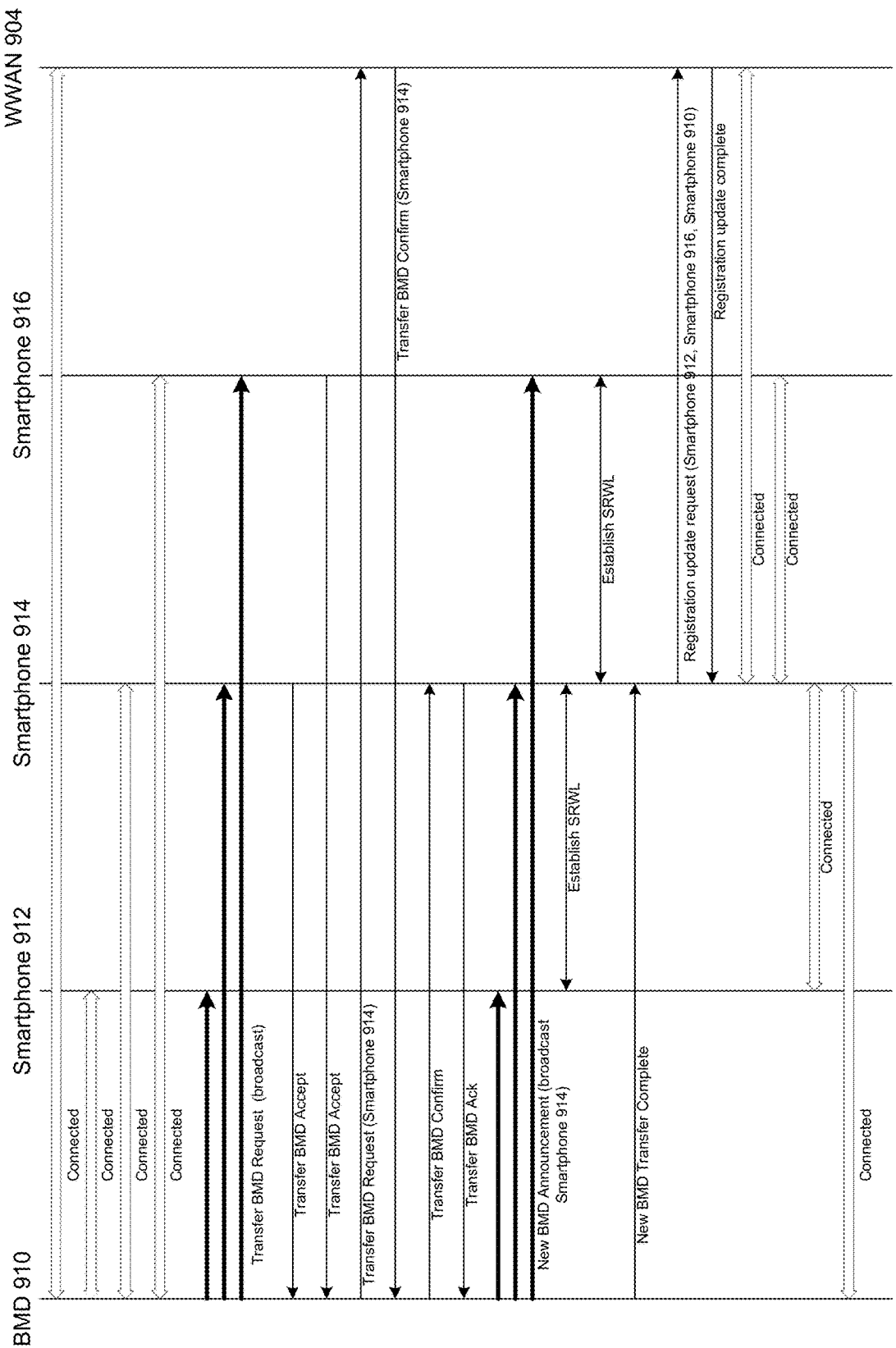
FIG. 18 illustrates an MSC for the use case of a transfer of a BMD from one device to another device according to the aspects of the present disclosure.

The further details of the processing steps are illustrated by the MSC in FIG. 18 where the BMD 910 is the initially serving $BMD_s$ and it is connected to the WWAN 904. All the GMD Smartphones 912, 914 and 916 are connected to the BMD 910. Next the BMD 910 initiates the process of transferring the GMDs ownership to another device by sending a broadcast message Transfer BMD request. In response to this message, the GMD Smartphone 914 and GMD Smartphone 916 respond with a Transfer BMD accept message, including their respective capabilities, to the BMD 910. The GMD Smartphone 912 may not send such a message as it may be unable (e.g., due to hardware or software limitations) or not allowed (e.g., due to user configuration) to act as a BMD. According to an aspect of the present disclosure, a client device may be configurable by its user regarding whether it can serve as a BMD or not. Based on the capabilities specified in the Transfer BMD accept message, the BMD 910 may select GMD Smartphone 914 to be the $BMD_n$. Next the BMD 910 may send a Transfer BMD request message with identities and capability information for the Smartphone 914 to the WWAN 904. The WWAN 904 may send a Transfer BMD confirm message to accept the newly recommended $BMD_n$ as the next BMD to serve the GMDs. The BMD 910 then may send the Transfer BMD confirm message to the Smartphone 914 along with all the context information for all the GMDs served by it. The Smartphone 914 may acknowledge this confirmation by sending Transfer BMD Ack message. Next the $BMD_c$ 910 may send a broadcast message New BMD Announcement with the BMD identity $BMD_n$ to inform all the GMDs in the area that it is the new BMD is going to serve them. All the GMDs in that area may establish the SRWL with the new $BMD_n$. Once the $BMD_c$ sees the SRWL disconnection from all the GMDs except the $BMD_n$ the $BMD_c$ may send a New BMD transfer complete message to $BMD_n$. The $BMD_n$ as soon as it sees the connections with the GMDs whose registration contexts were transferred by $BMD_c$, At this point, the Smartphone 914 sends a Registration update request message to the WWAN 904 identifying itself as the BMD and indicating all the GMDs served by it. The WWAN 904 may send a Registration update complete message to the BMD Smartphone 914. At this point the Smartphone 914 is connected to GMDs Smartphone 912 and 916 as well as the old BMD 910 which is now a GMD to the new BMD Smartphone 914. The BMD Smartphone 914 is in turn connected to WWAN 904.

According to an aspect of the present disclosure, in case a GMD that was served by the BMD 910 is unable to connect with the new BMD Smartphone 914, it may perform registration procedure directly with the WWAN 904.

According to an aspect of the present disclosure, if the $BMD_c$ is not able to identify a $BMD_n$ from within the current set of GMDs registered to it, it may notify the GMDs about its intention to cease to be a BMD. In this case, according to an aspect of the present disclosure, the GMDs may register directly with the WWAN if they have the capability and the WWAN is available.

According to an aspect of the present disclosure if the BMD is powering down it may follow the same procedure as described for the case where the serving BMD needs to move away from its serving area. According to an aspect of the present disclosure the BMD may complete the GMDs context transfer to a new BMD and then it may do its own power down notification to the WWAN.

According to an aspect of the present disclosure, in the group mobile scenario, for example, all the GMDs may be travelling along with the BMD in a vehicle, then the BMD's registration and link establishment procedure with the WWAN will continue as normal but it may be seamless to the GMDs that are registered with the BMD. For example, a BMD may perform a number of cell reselection and handover procedures which may be transparent to the GMDs registered to that BMD.

According to an aspect of the present disclosure, the BMD 910 may be connected to the WWAN through the interface 928. For example, the interface 928 may use the 3$^{rd}$ Generation Partnership Project (3GPP) based Long Term Evolution (LTE) wireless communication system. According to an aspect of the present disclosure, the BMD 910 may not be connected directly to the WWAN but instead through the internet using the interface 930. For example, the interface 930 may be a cable modem. According to an aspect of the present disclosure, the BMD 910 may be connected to the WWAN through the internet using the interface 918 between WWAN and internet.

According to an aspect of the present disclosure, all the GMDs registered with the BMD may simultaneously receive internet service; IMS/SIP based voice calls and text messaging using the single connection by BMD with the WWAN.

According to an aspect of the present disclosure, the number of active GMDs that can be supported by a BMD may be limited by the service provider such as the WWAN operator, or limited by the BMD capability or may be limited by the available data bandwidth to support the QoS required for multiple GMDs served by the BMD.

According to an aspect of the present disclosure, if the BMD enters into an area where the BMD is not able to maintain a normal service connection with the WWAN, then the BMD may notify the limited WWAN service or no WWAN service indication to the GMDs. According to another aspect of the present disclosure, when the GMDs receive limited WWAN service or no WWAN service indication from the BMD, then the GMDs may deregister with the BMD and may register directly with the WWAN network.

According to another aspect of the present disclosure, when the GMDs are directly registered with the WWAN, they may still continue to stay connected with BMD via the SWRL to keep monitoring the status of the WWAN service change notification from the BMD.

According to another aspect of the present disclosure, when the BMD moves from limited WWAN service area or from no WWAN service area to normal WWAN service area then the BMD may broadcast the normal WWAN service availability notification to the GMDs. According to another aspect of the present disclosure, when the GMDs receive the normal WWAN service notification from BMD then they may deregister with the WWAN and may register to the WWAN through the BMD.

Figure 2:
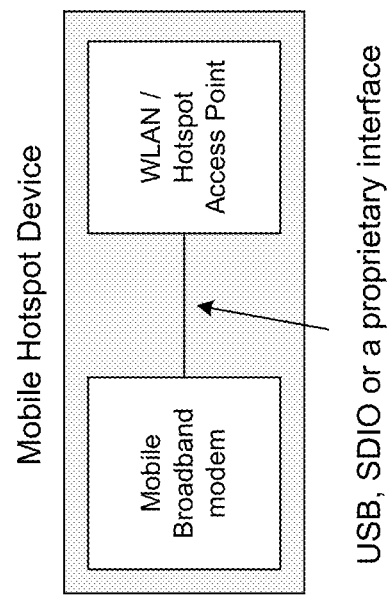
FIG. 2 illustrates a high-level block diagram of an example mobile Hotspot device.
Figure 3:
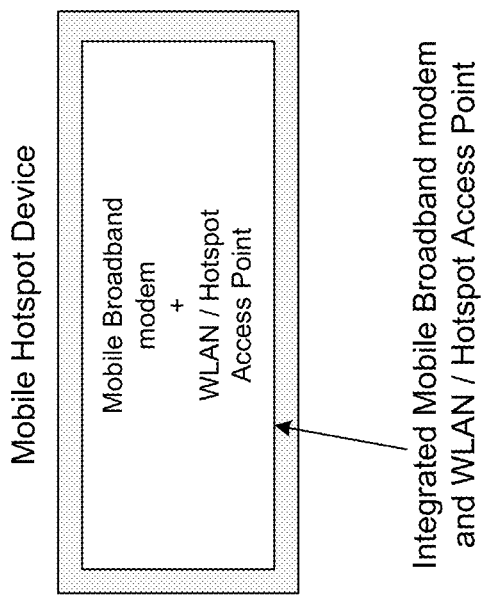
FIG. 3 illustrates a high-level block diagram of an example mobile Hotspot device with an integrated mobile broadband modem and WLAN Access Point.
Figure 4:
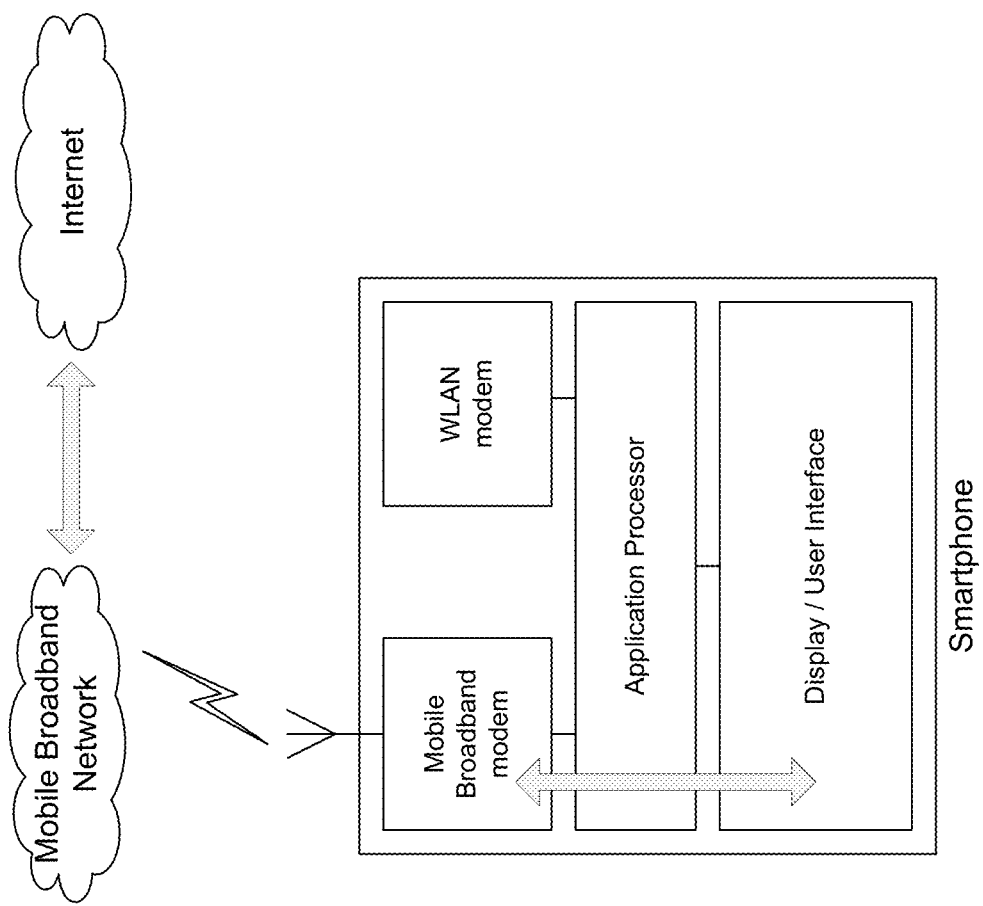
FIG. 4 illustrates a use case of internet access over a mobile broadband network by a smartphone client device.
Figure 5:
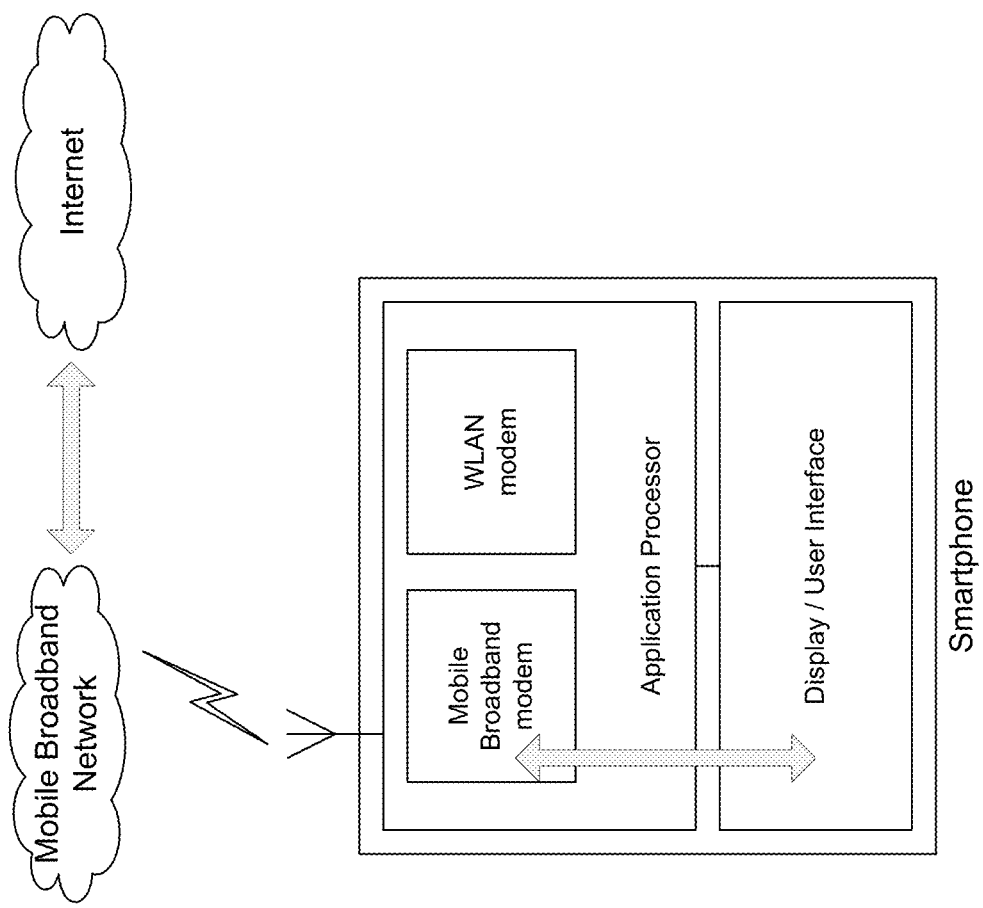
FIG. 5 illustrates a use case of internet access over a mobile broadband network by a smartphone client device with an integrated mobile broadband modem, WLAN Access Point, and Application Processor.

By way of example only, the above-described methods for BMD may be implemented in a mobile Hotspot device such as illustrated in FIG. 2 and FIG. 3. By way of example only, the above-described methods for GMD may be implemented in a smartphone device such as illustrated in FIG. 4 and FIG. 5.

Figure 19:
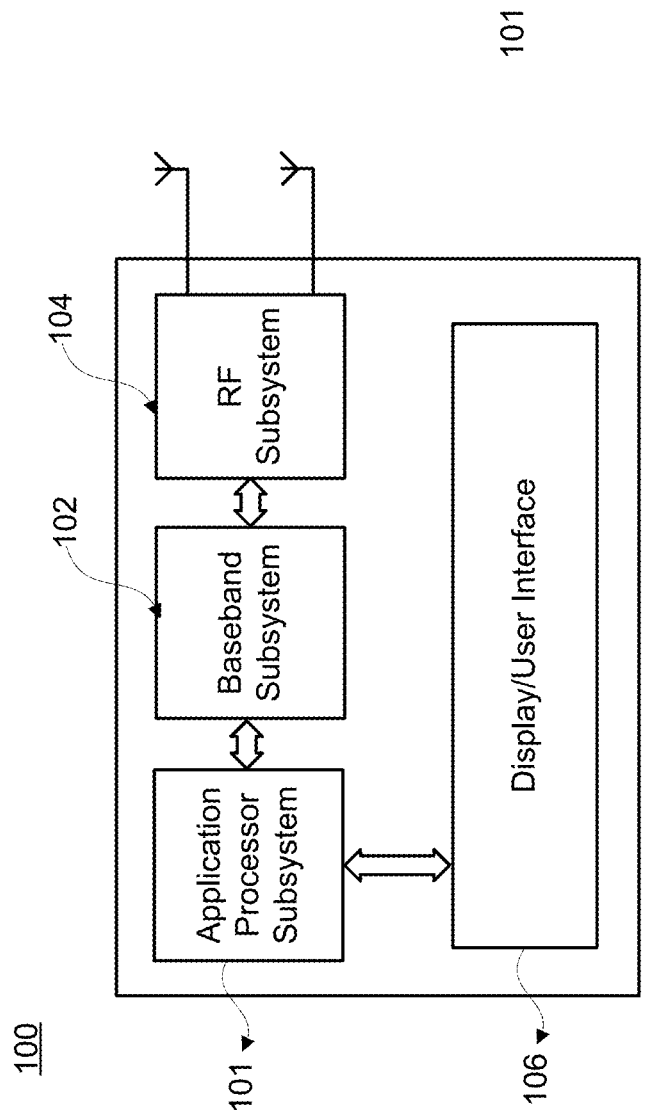
FIG. 19 illustrates a wireless mobile station diagram, which may be employed with aspects of the present disclosure described herein.

As shown in FIG. 19, a BMD or a GMD 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some BMD or GMD devices, certain combination of the application processor subsystem 101, the baseband subsystem 102 and the RF subsystem 104 may be all integrated as one integrated chip.

Figure 20:
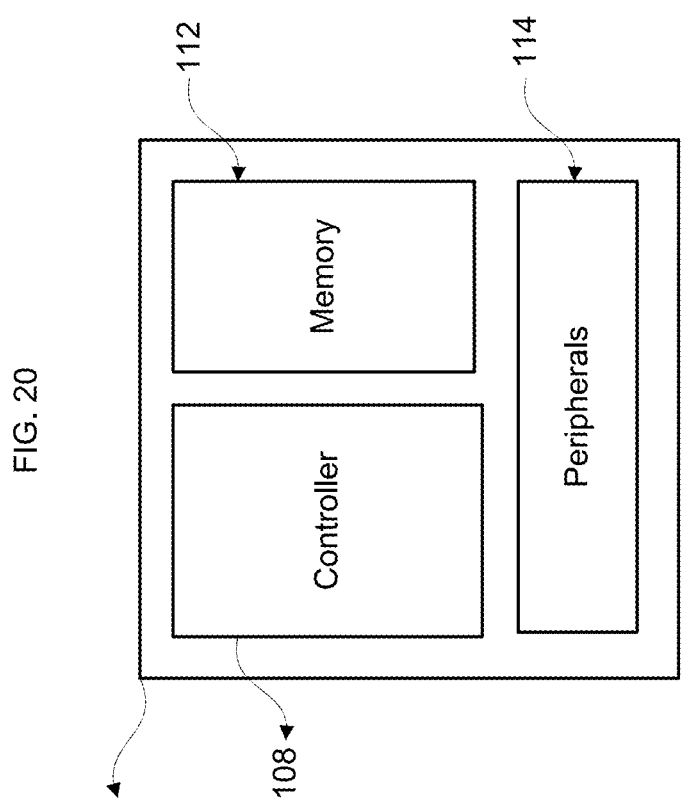
FIG. 20 illustrates an application processor subsystem for a wireless mobile station, which may be employed with aspects of the present disclosure described herein.
Figure 21:
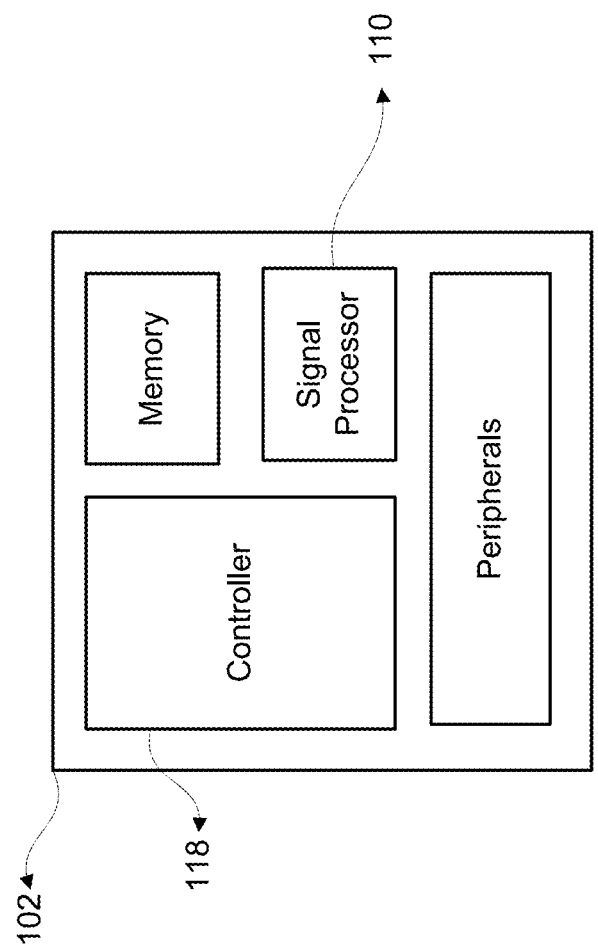
FIG. 21 illustrates a baseband subsystem for a wireless mobile station, which may be employed with aspects of the present disclosure described herein.
Figure 22:
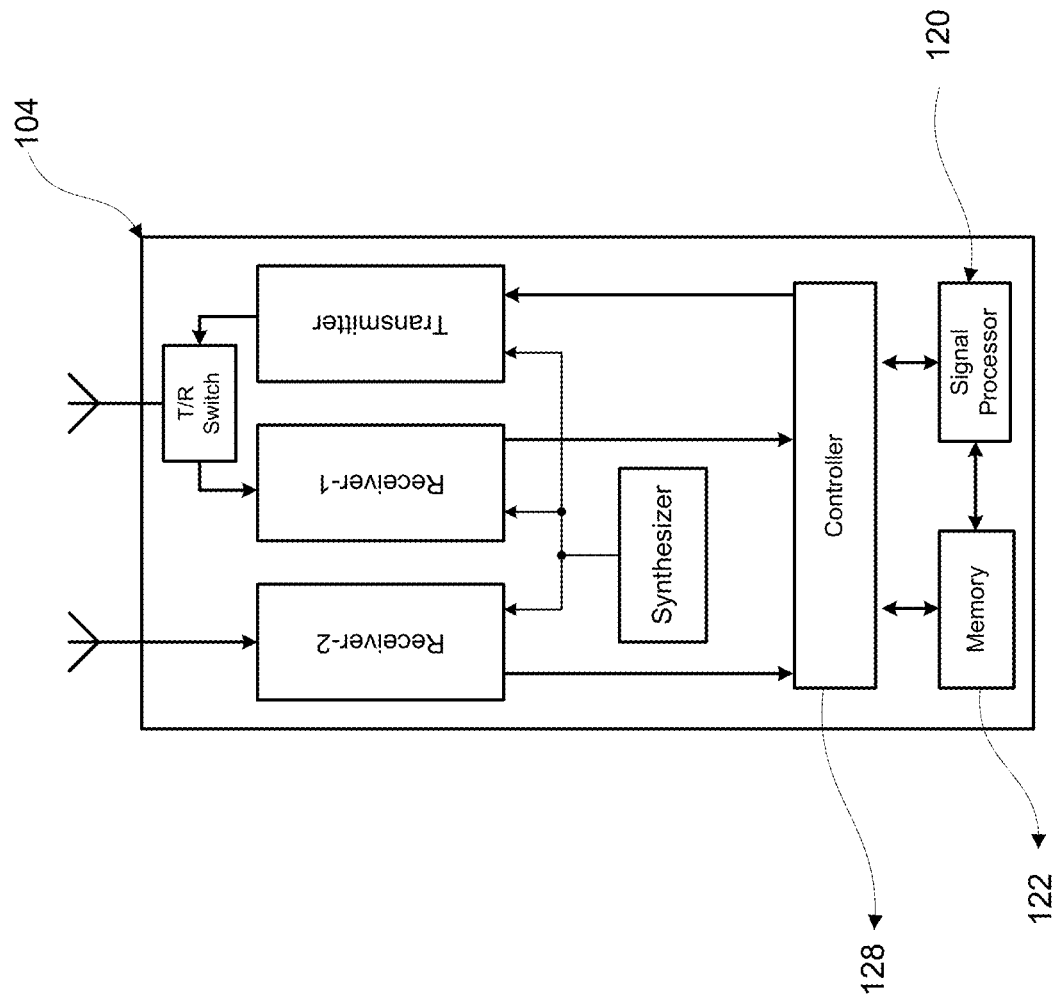
FIG. 22 illustrates an RF subsystem for a wireless mobile station, which may be employed with aspects of the present disclosure described herein.

The application processor subsystem 101 as shown in FIG. 20 may include a controller 108 such as a microcontroller or other processor. The baseband subsystem 102 as shown in FIG. 21 may include a controller 118 such as a microcontroller or other processor. The RF subsystem 104 as shown in FIG. 22 may include a controller 128 such as a microcontroller or other processor. The controller 108 in application processor subsystem in FIG. 20 desirably handles overall operation of the BMD or GMD. This may be done by software or firmware running on the controller 108. Such software/firmware may embody any methods in accordance with the aspects of the present disclosure.

In FIG. 20 the peripherals 114 such as a full or partial keyboard, video or still image display, audio interface, etc may be employed and managed through the controller 108.

Aspects of the present disclosure may be implemented in firmware of the controller 108 of the application processor shown in FIG. 20 and/or the controller 118 of the baseband subsystem shown in FIG. 21. In another alternative, aspects of the present disclosure may also be implemented as a combination of firmware and hardware of the application processor subsystem 101 and/or the baseband subsystem 102 as shown in FIG. 19. For instance, signal processing functionality of any or all of the FIG. 21 may be implemented in firmware and/or software, which is executed by the system hardware. It may be part of the baseband subsystem, the receiver subsystem or be associated with both subsystems. In one example, the controller 118 and/or the signal processor 110 of the base band subsystem shown in FIG. 21 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The various aspects of the present disclosure described herein provide a new and more efficient method of processing for wireless client terminals. And this may lead to improved performance of such portable communication devices in cellular communications systems.

The consumer electronics devices that may use this present disclosure may include smartphones, tablets, laptops, gaming consoles, cameras, video camcorders, TV, car entertainment systems, etc.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for sharing broadband communication services with a first client device of a plurality of client devices as Group Member Devices (GMDs) which are connectable with a base mobile device (BMD) to obtain internet service, wherein when a first GMD of the GMDs is in a coverage area of the BMD the first GMD can connect with and obtain internet service from the BMD through Short Range Wireless Links (SRWL) via a first modem of the BMD, and wherein when the first GMD is connected with the BMD via a wired connection the first GMD can connect and obtain the internet service from the BMD via the wired connection, the method comprising:

controlling, by a processing device at the first GMD, registering the first GMD with the BMD to obtain the internet service from a Wireless Wide Area Network (WWAN) through the BMD; and when the first GMD is registered with the BMD, deregistering with the BMD before the first GMD is registered directly with the WWAN with a same identity, further comprising:
controlling, by the processing device, when the first GMD is near an edge of the coverage area of the BMD or a first GMD is controlled based on input from a user not to be connected with the BMD, initiating a WWAN related registration procedure including at least one of Location Area Update (LAU), Tracking Area Update (TAU) or Routing Area Update (RAU) with the WWAN, to cause automatic deregistration of the first GMD from the BMD and the WWAN to inform the BMD about the first GMD previously registered with the BMD now being registered directly with the WWAN.

2. The method of claim 1, wherein the first GMD has multiple unique identities and can connect to the WWAN directly with the same unique identity.

3. The method of claim 1, further comprising:
controlling, by the processing device, originating at the first GMD a service including at least one of a voice call, video call or a SMS based text messaging with the WWAN through the BMD.

4. The method of claim 1, further comprising:
controlling, by the processing device, transmitting a message to the BMD indicating intent to deregister the first GMD prior to disconnecting of the first GMD from the BMD.

5. The method of claim 1, further comprising:
controlling, by the processing device, when the first GMD moves out of the coverage area of the BMD for a period of time $T_{cg}$, initiating a direct registration with the WWAN to obtain service at the first GMD from the WWAN.

6. The method of claim 1, further comprising:
controlling, by the processing device, when a new GMD is registered with the BMD and registration information of the first GMD is updated with the WWAN when the new GMD is registered with the WWAN by the BMD, extending a timer for periodic registration update in the first GMD.

7. The method of claim 1, further comprising:
controlling, by the processing device, when the first GMD is registered with the BMD, sharing capability of the first GMD with the BMD, in which the capability includes ability to operate as a given BMD, service capability, Quality of Service (QoS) supported or SRWLs supported.

8. A method for sharing broadband communication services with a first client device of a plurality of client devices as Group Member Devices (GMDs) which are connectable with a base mobile device (BMD) to obtain internet service, wherein when a first GMD of the GMDs is in a coverage area of the BMD the first GMD can connect with and obtain internet service from the BMD through Short Range Wireless Links (SRWL) via a first modem of the BMD, and wherein when the first GMD is connected with the BMD via a wired connection the first GMD can connect and obtain the internet service from the BMD via the wired connection, the method comprising:
controlling, by a processing device at the first GMD,
registering the first GMD with the BMD to obtain the internet service from a Wireless Wide Area Network (WWAN) through the BMD; and
when the first GMD is registered with the BMD, deregistering with the BMD before the first GMD is registered directly with the WWAN with a same identity, further comprising:
controlling, by the processing device,
when the first GMD moves out of the coverage of the BMD for a period of time $T_{cg}$, and the first GMD returns into the coverage area of BMD after the time period $T_{cg}$, initiating a BMD registration procedure to register with the BMD and then with the WWAN to obtain service from the WWAN; and
when the first GMD enters the coverage area of the BMD after the time period $T_{cg}$ and the first GMD is directly registered with the WWAN, deregistering the first GMD with the WWAN before attempting to register the first GMD with the BMD.

9. An apparatus for sharing broadband communication services with a first client device of a plurality of client devices as Group Member Devices (GMDs) which are connectable with a base mobile device (BMD) to obtain internet service, wherein when a first GMD of the GMDs is in a coverage area of the BMD the first GMD can connect with and obtain internet service from the BMD through Short Range Wireless Links (SRWL) via a first modem of the BMD, and wherein when the first GMD is connected with the BMD via a wired connection the first GMD can connect and obtain the internet service from the BMD via the wired connection, the apparatus comprising:
circuitry configured to control at the first GMD,
registering the first GMD with the BMD to obtain the internet service from a Wireless Wide Area Network (WWAN) through the BMD; and
when the first GMD is registered with the BMD, deregistering with the BMD before the first GMD is registered directly with the WWAN with a same identity,
wherein the circuitry is configured to control, when the first GMD is near an edge of the coverage area of the BMD or a first GMD is controlled based on input from a user not to be connected with the BMD, initiating a WWAN related registration procedure including at least one of Location Area Update (LAU), Tracking Area Update (TAU) or Routing Area Update (RAU) with the WWAN, to cause automatic deregistration of the first GMD from the BMD and the WWAN to inform the BMD about the first GMD previously registered with the BMD now being registered directly with the WWAN.

10. The apparatus of claim 9, wherein the first GMD has multiple unique identities and can connect to the WWAN directly with the same unique identity.

11. The apparatus of claim 9,
wherein the circuitry is configured to control originating at the first GMD a service including at least one of a voice call, video call or a SMS based text messaging with the WWAN through the BMD.

12. The apparatus of claim 9,
wherein the circuitry is configured to control transmitting a message to the BMD indicating intent to deregister the first GMD prior to disconnecting of the first GMD from the BMD.

13. The apparatus of claim 9,
wherein the circuitry is configured to control, when the first GMD moves out of the coverage area of the BMD for a period of time $T_{cg}$, initiating a direct registration with the WWAN to obtain service at the first GMD from the WWAN.

14. The apparatus of claim 9,
wherein the circuitry is configured to control, when a new GMD is registered with the BMD and registration information of the first GMD is updated with the WWAN when the new GMD is registered with the WWAN by the BMD, extending a timer for periodic registration update in the first GMD.

15. The apparatus of claim 9,
wherein the circuitry is configured to control, when the first GMD is registered with the BMD, sharing capability of the first GMD with the BMD, in which the capability includes ability to operate as a given BMD, service capability, Quality of Service (QoS) supported or SRWLs supported.

16. An apparatus for sharing broadband communication services with a first client device of a plurality of client devices as Group Member Devices (GMDs) which are connectable with a base mobile device (BMD) to obtain internet service, wherein when a first GMD of the GMDs is in a coverage area of the BMD the first GMD can connect with and obtain internet service from the BMD through Short Range Wireless Links (SRWL) via a first modem of the BMD, and wherein when the first GMD is connected with the BMD via a wired connection the first GMD can connect and obtain the internet service from the BMD via the wired connection, the apparatus comprising:
    circuitry configured to control at the first GMD,
        registering the first GMD with the BMD to obtain the internet service from a Wireless Wide Area Network (WWAN) through the BMD; and
        when the first GMD is registered with the BMD, deregistering with the BMD before the first GMD is registered directly with the WWAN with a same identity,
    wherein the circuitry is configured to control,
        when the first GMD moves out of the coverage of the BMD for a period of time $T_{cg}$, and the first GMD returns into the coverage area of BMD after the time period $T_{cg}$, initiating a BMD registration procedure to register with the BMD and then with the WWAN to obtain service from the WWAN; and
        when the first GMD enters the coverage area of the BMD after the time period $T_{cg}$ and the first GMD is directly registered with the WWAN, deregistering the first GMD with the WWAN before attempting to register the first GMD with the BMD.

* * * * *